(12) United States Patent
Chu et al.

(10) Patent No.: US 11,533,608 B2
(45) Date of Patent: Dec. 20, 2022

(54) METHOD AND APPARATUS FOR WIRELESS OPERATIONS BASED ON A GIVEN BANDWIDTH AND MODULATION AND CODING SCHEME

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US); Huiling Lou, Sunnyvale, CA (US)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 17/199,421

(22) Filed: Mar. 11, 2021

(65) Prior Publication Data

US 2021/0289347 A1    Sep. 16, 2021

Related U.S. Application Data

(60) Provisional application No. 62/990,381, filed on Mar. 16, 2020, provisional application No. 62/990,385, filed on Mar. 16, 2020, provisional application No. 62/987,911, filed on Mar. 11, 2020.

(51) Int. Cl.
| | |
|---|---|
| *H04W 8/24* | (2009.01) |
| *H04L 1/00* | (2006.01) |
| *H04W 88/10* | (2009.01) |
| *H04L 1/16* | (2006.01) |

(52) U.S. Cl.
CPC ............. *H04W 8/24* (2013.01); *H04L 1/0003* (2013.01); *H04L 1/0068* (2013.01); *H04L 1/1614* (2013.01); *H04W 88/10* (2013.01)

(58) Field of Classification Search
CPC ...... H04W 8/24; H04W 88/10; H04L 1/0003; H04L 1/0068; H04L 1/1614
See application file for complete search history.

(56) References Cited

U.S. PATENT DOCUMENTS

| | | | |
|---|---|---|---|
| 10,750,522 B2 * | 8/2020 | Alpert | H04W 72/1284 |
| 2019/0335454 A1 * | 10/2019 | Huang | H04L 41/0893 |
| 2020/0359299 A1 * | 11/2020 | Suh | H04W 48/08 |

OTHER PUBLICATIONS

Fischer, Matthew, "IEEE P802.11 Wireless LANs; BSS Basic HE-MCS per Bandwidth", IEEE 802.11-17/1244r0, Sep. 2017, 7 pgs.

(Continued)

*Primary Examiner* — Afshawn M Towfighi

(57) ABSTRACT

Embodiments of a method and an apparatus for wireless operations are disclosed. In an embodiment, a method for wireless operations involves announcing, by a first wireless device to a second wireless device, capability parameters, wherein the first wireless device operates according to a first communication protocol and has a first bandwidth capability, and wherein the first wireless device operates according to a second communication protocol and has a second bandwidth capability that is narrower than the first bandwidth capability, receiving, at the second wireless device, the capability parameters announced by the first wireless device, and operating the second wireless device according to the capability parameters announced by the first wireless device.

20 Claims, 26 Drawing Sheets

(56) References Cited

OTHER PUBLICATIONS

Huang, Po-Kai et al. "IEEE P802.11 Wireless LANs; 11ax D3.0 MAC Comment Resolution for Capability of MU Transmission and Reception", LB2001,Dec. 2018, 10 pgs.
Seok, Yongho et al. "IEEE P802.11 Wireless LANs; LB238 CR PPDU format, BW, MCS, NSS, and DCM selection", IEEE 802.11-19/0770r5, Sep. 2019, 9 pgs.

* cited by examiner

| Rx HE-MCS MAP ≤ 80 MHz 202 | Tx HE-MCS MAP ≤ 80 MHz 204 | Rx HE-MCS MAP 160 MHz 206 | Tx HE-MCS MAP 160 MHz 208 | Rx HE-MCS MAP 80+80 MHz 210 | Tx HE-MCS MAP 80+80 MHz 212 |
|---|---|---|---|---|---|
| 2 | 2 | 0 OR 2 | 0 OR 2 | 0 OR 2 | 0 OR 2 |

OCTETS:

| B0 | B1 B2 | B3 B4 | B5 B6 | B7 B8 | B9 B10 | B11 B12 | B13 B14 | B15 |
|---|---|---|---|---|---|---|---|---|
| | MAX HE-MCS FOR 1 SS 302-1 | MAX HE-MCS FOR 2 SS 304-1 | MAX HE-MCS FOR 3 SS 306-1 | MAX HE-MCS FOR 4 SS 308-1 | MAX HE-MCS FOR 5 SS 310-1 | MAX HE-MCS FOR 6 SS 312-1 | MAX HE-MCS FOR 7 SS 314-1 | MAX HE-MCS FOR 8 SS 316-1 |

| B0 B1 | B2 B3 | B4 B5 | B6 B7 | B8 B9 | B10 B11 | B12 B13 | B14 B15 |
|---|---|---|---|---|---|---|---|
| MAX VHT-MCS FOR 1 SS 302-2 | MAX VHT-MCS FOR 2 SS 304-2 | MAX VHT-MCS FOR 3 SS 306-2 | MAX VHT-MCS FOR 4 SS 308-2 | MAX VHT-MCS FOR 5 SS 310-2 | MAX VHT-MCS FOR 6 SS 312-2 | MAX VHT-MCS FOR 7 SS 314-2 | MAX VHT-MCS FOR 8 SS 316-2 |

| Transmitted Operating Mode Field | | VHT Capabilities of STA Transmitting the Operating Mode Field | | NSS Support of STA Transmitting the Operating Mode Field as a Function of the VHT PPDU (xMax VHT NSS) | | | | | Location of 160 MHz Center Frequency if BSS Bandwidth is 160 MHz | Location of Secondary 80 MHz Center Frequency if BSS Bandwidth is 80+80 MHz |
|---|---|---|---|---|---|---|---|---|---|---|
| Channel Width | 160/80+80 BW | Supported Channel Width Set | Extended NSS BW Support | 20 MHz | 40 MHz | 80 MHz | 160 MHz | 80+80 MHz | | |
| 0 | 0 | 0-2 | 0-3 | 1 | | | | | | |
| 1 | 0 | 0-2 | 0-3 | 1 | 1 | | | | | |
| 2 | 0 | 0-2 | 0-3 | 1 | 1 | 1 | | | | |
| 2 | 1 | 0 | 1 | 1 | 1 | 1 | 1/2 | | CCFS2 | |
| 2 | 1 | 0 | 2 | 1 | 1 | 1 | 1/2 | 1/2 | CCFS2 | CCFS2 |
| 2 | 1 | 0 | 3 | 1 | 1 | 1 | 3/4 | 3/4 | CCFS2 | CCFS2 |
| 2 | 1 | 1 | 0 | 1 | 1 | 1 | 1 | | CCFS1 | |
| 2 | 1 | 1 | 1 | 1 | 1 | 1 | 1 | 1/2 | CCFS1 | CCFS2 |
| 2 | 1 | 1 | 2 | 1 | 1 | 1 | 1 | 3/4 | CCFS1 | CCFS2 |
| 2 | 1 | 1 | 3 | 1 | 1 | 1 | 2 | 1 | CCFS1 | CCFS1 |
| 2 | 1 | 2 | 0 | 2 | 2 | 2 | 1 | 1 | CCFS1 | CCFS1 |
| 2 | 1 | 2 | 3 | 2 | 2 | 2 | 1 | 1 | CCFS1 | CCFS1 |

400

| ELEMENT ID 502 | LENGTH 504 | ELEMENT ID EXTENSION 506 | BASIC EHT-MCS AND NSS SET 508 | EHT OPERATING PARAMETERS 510 |
|---|---|---|---|---|

| ELEMENT ID 602 | LENGTH 604 | ELEMENT ID EXTENSION 606 | MAC CAPABILITIES 608 | PHY CAPABILITIES 610 | SUPPORT EHT-MCS AND NSS SET 612 |

THE LENGTH OF THE FIELD IS DECIDED BY BANDWIDTH CAPABILITY IN PHY CAPABILITIES FIELD → (points to 612)

| Rx MCS NSS MAP ≤80MHz 702 | Tx MCS NSS MAP ≤80MHz 704 | Rx MCS NSS MAP 160MHz 706 | Tx MCS NSS MAP 160MHz 708 | Rx MCS NSS MAP 320MHz 710 | Tx MCS NSS MAP 320MHz 712 |
|---|---|---|---|---|---|
| | | (OPTIONAL FIELDS) | | (OPTIONAL FIELDS) | |

| NSS WITH MCS ≤ 7 716 | NSS WITH MCS 8,9 718 | NSS WITH MCS 10,11 720 | NSS WITH MCS 12,13 722 |

FIG. 7B

| Rx MCS NSS MAP ≤80MHz 802-1 | Tx MCS NSS MAP ≤80MHz 804-1 | Rx MCS NSS MAP 160MHz 806-1 | Tx MCS NSS MAP 160MHz 808-1 | Rx MCS NSS MAP 320MHz 810-1 | Tx MCS NSS MAP 320MHz 812-1 |
|---|---|---|---|---|---|

| Rx MCS NSS MAP ≤ 80MHz 802-2 | Tx MCS NSS MAP ≤ 80MHz 804-2 | Rx MCS NSS MAP 160MHz 806-2 | Tx MCS NSS MAP 160MHz 808-2 |
|---|---|---|---|

| NSS WITH MCS ≤ 9 818-1 | NSS WITH MCS 10,11 820-1 | NSS WITH MCS 12,13 822-1 |

FIG. 8C 814-2

| NSS WITH MCS ≤ 7 816-2 | NSS WITH MCS 8,9 818-2 | NSS WITH MCS 10,11 820-2 | NSS WITH MCS 12,13 822-2 |

FIG. 8D

| ELEMENT ID 1002 | LENGTH 1004 | ELEMENT ID EXTENSION 1006 | EHT OPERATION PARAMETERS 1008 | BASIC EHT-MCS AND NSS SET 1010 |

| ELEMENT ID 1102 | LENGTH 1104 | ELEMENT ID EXTENSION 1106 | EHT-MAC CAPABILITIES INFORMATION 1108 | EHT-PHY CAPABILITIES INFORMATION 1110 | SUPPORTED EHT-MCS AND NSS SET 1112 |
|---|---|---|---|---|---|

| Rx EHT-MCS MAP ≤80 MHz 1202 | Tx EHT-MCS MAP ≤80 MHz 1204 | Rx EHT-MCS MAP 160 MHz 1206-1 | Tx EHT-MCS MAP 160 MHz 1208-1 | Rx EHT-MCS MAP 80+80 MHz 1210-1 | Tx EHT-MCS MAP 80+80 MHz 1212-1 | Rx EHT-MCS MAP 160 MHz 1206-2 | Tx EHT-MCS MAP 160 MHz 1208-2 | Rx EHT-MCS MAP 80+80 MHz 1210-2 | Tx EHT-MCS MAP 80+80 MHz 1212-2 |
|---|---|---|---|---|---|---|---|---|---|
| 6 | 6 | 0 OR 6 | 0 OR 6 | 0 OR 6 | 0 OR 6 | 0 OR 6 | 0 OR 6 | 0 OR 6 | 0 OR 6 |

OCTETS:

| B0 | B1 B2 | B3 B4 | B5 B6 | B7 B8 | B9 B10 | B11 B12 | B13 B14 | B15 B16 | B17 B18 | B19 B20 | B21 B22 | B23 B24 | B25 B26 | B27 B28 | B29 B30 | B31 B32 | B33 B34 | B35 B36 | B37 B38 | B39 B40 | B41 B42 | B43 B44 | B45 B46 | B47 |
|---|---|---|---|---|---|---|---|---|---|---|---|---|---|---|---|---|---|---|---|---|---|---|---|---|
| MAX EHT-MCS FOR 1 SS 1216 | MAX EHT-MCS FOR 2 SS 1218 | MAX EHT-MCS FOR 3 SS 1220 | MAX EHT-MCS FOR 4 SS 1222 | MAX EHT-MCS FOR 5 SS 1224 | MAX EHT-MCS FOR 6 SS 1226 | MAX EHT-MCS FOR 7 SS 1228 | MAX EHT-MCS FOR 8 SS 1230 | MAX EHT-MCS FOR 9 SS 1232 | MAX EHT-MCS FOR 10 SS 1234 | MAX EHT-MCS FOR 11 SS 1236 | MAX EHT-MCS FOR 12 SS 1238 | MAX EHT-MCS FOR 13 SS 1240 | MAX EHT-MCS FOR 14 SS 1242 | MAX EHT-MCS FOR 15 SS 1244 | MAX EHT-MCS FOR 16 SS 1246 |

FIG. 12B

| Rx EHT-MCS MAP ≤ 80 MHz 1302 | Tx EHT-MCS MAP ≤ 80 MHz 1304 | Rx EHT-MCS MAP 160 MHz 1306-1 | Tx EHT-MCS MAP 160 MHz 1308-1 | Rx EHT-MCS MAP 80+80 MHz 1310-1 | Tx EHT-MCS MAP 80+80 MHz 1312-1 | Rx EHT-MCS MAP 160 MHz 1306-2 | Tx EHT-MCS MAP 160 MHz 1308-2 | Rx EHT-MCS MAP 80+80 MHz 1310-2 | Tx EHT-MCS MAP 80+80 MHz 1312-2 |
|---|---|---|---|---|---|---|---|---|---|
| 4 | 4 | 0 OR 4 | 0 OR 4 | 0 OR 4 | 0 OR 4 | 0 OR 4 | 0 OR 4 | 0 OR 4 | 0 OR 4 |

OCTETS:

| | B0 | B1 | B2 | B3 | B4 | B5 | B6 | B7 | B8 B10 | B11 B13 B14 | B16 B17 | B19 B20 | B22 B23 | B25 B26 | B28 B29 B31 |
|---|---|---|---|---|---|---|---|---|---|---|---|---|---|---|---|
| 1314 | MAX EHT-MCS FOR 1 SS 1316 | MAX EHT-MCS FOR 2 SS 1318 | MAX EHT-MCS FOR 3 SS 1320 | MAX EHT-MCS FOR 4 SS 1322 | MAX EHT-MCS FOR 5 SS 1324 | MAX EHT-MCS FOR 6 SS 1326 | MAX EHT-MCS FOR 7 SS 1328 | MAX EHT-MCS FOR 8 SS 1330 | MAX EHT-MCS FOR 9 SS 1332 | MAX EHT-MCS FOR 10 SS 1334 | MAX EHT-MCS FOR 11 SS 1336 | MAX EHT-MCS FOR 12 SS 1338 | MAX EHT-MCS FOR 13 SS 1340 | MAX EHT-MCS FOR 14 SS 1342 | MAX EHT-MCS FOR 15 SS 1344 | MAX EHT-MCS FOR 16 SS 1346 |

METHOD AND APPARATUS FOR WIRELESS OPERATIONS BASED ON A GIVEN BANDWIDTH AND MODULATION AND CODING SCHEME

CROSS-REFERENCE TO RELATED APPLICATIONS

This application is entitled to the benefit of U.S. Provisional Patent Application Ser. No. 62/987,911, filed on Mar. 11, 2020, and U.S. Provisional Patent Application Ser. No. 62/990,381, filed on Mar. 16, 2020, and U.S. Provisional Patent Application Ser. No. 62/990,385, filed on Mar. 16, 2020, each of which is incorporated by reference herein.

BACKGROUND

In wireless communications, wireless devices, e.g., access point (AP) multi-link devices (MLDs) or non-AP MLDs, e.g., STA multi-link devices (STA MLDs), can execute various wireless operations, such as announcements of some features or operations for devices in a multi-link Basic Service Set (BSS) via one or more channels. As an example, a wireless AP MLD or a wireless STA MLD may announce capability parameters that are in accordance with the maximum support capabilities of each wireless device. However, when APs of the wireless AP MLD have greater support capabilities (e.g., bandwidth, number of spatial streams (NSS), etc.) than an associated STA MLD's STAs involved in the wireless operations, there is a need to efficiently execute the wireless operations.

SUMMARY

Embodiments of a method and an apparatus for wireless operations are disclosed. In an embodiment, a method for wireless operations involves announcing, by a first wireless device to a second wireless device, capability parameters, wherein the first wireless device operates according to a first communication protocol and has a first bandwidth capability, and wherein the first wireless device operates according to a second communication protocol and has a second bandwidth capability that is narrower than the first bandwidth capability, receiving, at the second wireless device, the capability parameters announced by the first wireless device, and operating the second wireless device according to the capability parameters announced by the first wireless device.

In an embodiment, the first wireless device is an access point (AP) of an AP multi-link device (AP MLD) and the second wireless device is a station (STA) of a STA multi-link device (STA MLD).

In an embodiment, the first communication protocol is an Extremely High Throughput (EHT) communication protocol and the second communication protocol is at least one of a High Efficiency (HE) communication protocol and a Very High Throughput (VHT) communication protocol.

In an embodiment, capability parameters include at least one of modulation and coding schemes (MCS), number of spatial streams (NSS), number of space time streams (NSTS), channel width (CW), and bandwidth of at least one of the first wireless device and the second wireless device.

In an embodiment, wherein a max supported HE bandwidth by the second wireless device is no more than a max supported EHT bandwidth by the first wireless device.

In an embodiment, the max supported HE bandwidth by the second wireless device is the same as the max supported EHT bandwidth by the first wireless device when the max supported EHT bandwidth is no more than 160 MHz.

In an embodiment, the max supported HE bandwidth by the second wireless device is 160 MHz when the max supported EHT bandwidth is more than 160 MHz.

In an embodiment, at a given bandwidth and MCS allowed by the HE communication protocol, a max supported HE NSS by the second wireless device is no more than a max supported EHT NSS by the first wireless device.

In an embodiment, the max supported HE NSS by the second wireless device is the same as the max supported EHT NSS at the given bandwidth and MCS when the max supported EHT NSS by the first wireless device at the given bandwidth and MCS is no more than 8.

In an embodiment, the max supported HE NSS by the second wireless device is 8 at the given bandwidth and MCS when the max supported EHT NSS by the first wireless device is more than 8.

In an embodiment, at the given bandwidth and MCS allowed by the HE communication protocol, a max supported HE NSTS by the second wireless device is no more than a max supported EHT NSTS by the first wireless device.

In an embodiment, the max supported HE NSTS by the second wireless device is the same as the max supported EHT NSS at the given bandwidth and MCS when the max supported EHT NSTS by the first wireless device is no more than 8.

In an embodiment, the max supported HE NSTS by the second wireless device is 8 at the given bandwidth and MCS when the when the max supported EHT NSTS by the first wireless device is more than 8.

In an embodiment, announcing capability parameters involves announcing an EHT MCS and NSS support for a bandwidth of at least one of no more than 80 MHz, 160 MHz, and 320 MHz, and wherein, a reception (Rx) NSS and a transmission (Tx) NSS with an MCS no more than 7 is the same as the Rx NSS and the Tx NSS with an MCS of 8 and an MCS of 9 when the second wireless device has a bandwidth capability of more than 20 MHz.

In an embodiment, a Supported EHT MCS And NSS indicates the EHT MCS and NSS support, and wherein, the Supported EHT MCS And NSS includes an Rx MCS NSS Map field and a Tx MCS NSS Map field for a bandwidth of no more than 80 MHz, an optional Rx MCS NSS Map field and a Tx MCS NSS Map field for a bandwidth of 160 MHz, and an optional Rx MCS NSS Map field and a Tx MCS NSS Map field for a bandwidth of 320 MHz.

In an embodiment, an Rx EHT-MCS Map subfields and Tx EHT-MCS Map subfields and Basic EHT-MCS And NSS Set field is implemented in the Supported EHT MCS And NSS to indicate NSS support at a given MCS, and wherein, the Rx EHT-MCS Map subfields and Tx EHT-MCS Map subfields and Basic EHT-MCS And NSS Set field includes an optional NSS with MCS no more than 7 field, an NSS with 8, 9 field, an NSS with MCS 10, 11 field, and an NSS with MCS 12, 13 field.

In an embodiment, an EHT-NSS MCS and basic EHT-MCS NSS Support are defined independently and a Max EHT-MCS for n spatial streams (SS) subfield is encoded to indicate a maximal MCS for n SS, and wherein n is no less than 1 and no more than 16.

In an embodiment, the method involves announcing a Basic Service Set (BSS) operating channel via at least one of, (i) an EHT Operation Element when the BSS operating channel is more than 40 MHz, wherein the EHT Operation Element includes an EHT center channel frequency segment (CCFS) value to indicate the BSS operating channel, and (ii) at least one of a High Throughput (HT) operation element, a VHT operation element, and an EHT operation element when the BSS operation channel is no more than 160 MHz and does not include punctured 20 MHz channels.

In an embodiment, the BSS operating channel includes at least one of punctured 20 MHz channels and unpunctured 20 MHz channels, wherein, punctured 20 MHz channels of the BSS operating channel are determined by an allowed EHT BSS Channel Puncture, and wherein, punctured 20 MHz channels and unpunctured 20 MHz channels of the BSS operating channel are represented by an available Channel Bitmap.

An embodiment of a first wireless device is also disclosed. The first wireless device includes a processor configured to announce, to a second wireless device, capability parameters, wherein the first wireless device operates according to a first communication protocol and has a first bandwidth capability, and wherein the first wireless device operates according to a second communication protocol and has a second bandwidth capability that is narrower than the first bandwidth capability, receive, at the second wireless device, the capability parameters announced by the first wireless device, and operate the second wireless device according to the capability parameters announced by the first wireless device.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 2 depicts an example of a Supported High Efficiency modulation and coding schemes (HE-MCS) And number of spatial streams (NSS) Set field.

FIG. 3A depicts an example of a reception (Rx) HE-MCS Map subfields, transmission (Tx) HE-MCS Map subfields, and a Basic HE-MCS And NSS Set field.

FIG. 3B depicts an example of an Rx Very High Throughput modulation and coding schemes (VHT-MCS) Map subfields, Tx VHT-MCS Map subfields, and a Basic VHT-MCS And NSS Set field.

FIG. 4 is a table that represents settings of a transmitted Operating Mode field.

FIG. 5 depicts an example of an Extremely High Throughput (EHT) Operating Element that may be used in accordance with an embodiment of the invention.

FIG. 6 depicts an example of an EHT Capabilities Element that may be used in accordance with an embodiment of the invention.

FIG. 7A depicts an example of a Supported Extremely High Throughput modulation and coding schemes (EHT-MCS) And NSS Set that may be used in accordance with an embodiment of the invention.

FIG. 7B depicts an example of an Rx EHT-MCS Map subfields and Tx EHT-MCS Map subfields and a Basic EHT-MCS And NSS Set field that may be used in accordance with an embodiment of the invention.

FIG. 8A depicts another example of a Supported EHT-MCS And NSS Set that may be used in accordance with an embodiment of the invention.

FIG. 8B depicts another example of a Supported EHT-MCS And NSS Set that may be used in accordance with an embodiment of the invention.

FIG. 8C depicts an example of an Rx EHT-MCS Map subfields and Tx EHT-MCS Map subfields that may be used in accordance with an embodiment of the invention.

FIG. 8D depicts another example of an Rx EHT-MCS Map subfields and Tx EHT-MCS Map subfields and a Basic EHT-MCS And NSS Set field that may be used in accordance with an embodiment of the invention.

FIG. 10 depicts another example of an EHT Operating Element that may be used in accordance with an embodiment of the invention.

FIG. 11 depicts another example of an EHT Capabilities Element that may be used in accordance with an embodiment of the invention.

FIG. 12A depicts another example of a Supported EHT-MCS And NSS Set that may be used in accordance with an embodiment of the invention.

FIG. 12B depicts another example of an Rx EHT-MCS Map subfields and Tx EHT-MCS Map subfields and a Basic EHT-MCS And NSS Set field that may be used in accordance with an embodiment of the invention.

FIG. 13A depicts another example of a Supported EHT-MCS And NSS Set that may be used in accordance with an embodiment of the invention.

FIG. 13B depicts another example of an Rx EHT-MCS Map subfields and Tx EHT-MCS Map subfields and a Basic EHT-MCS And NSS Set field that may be used in accordance with an embodiment of the invention.

Throughout the description, similar reference numbers may be used to identify similar elements.

DETAILED DESCRIPTION

Figure 1:
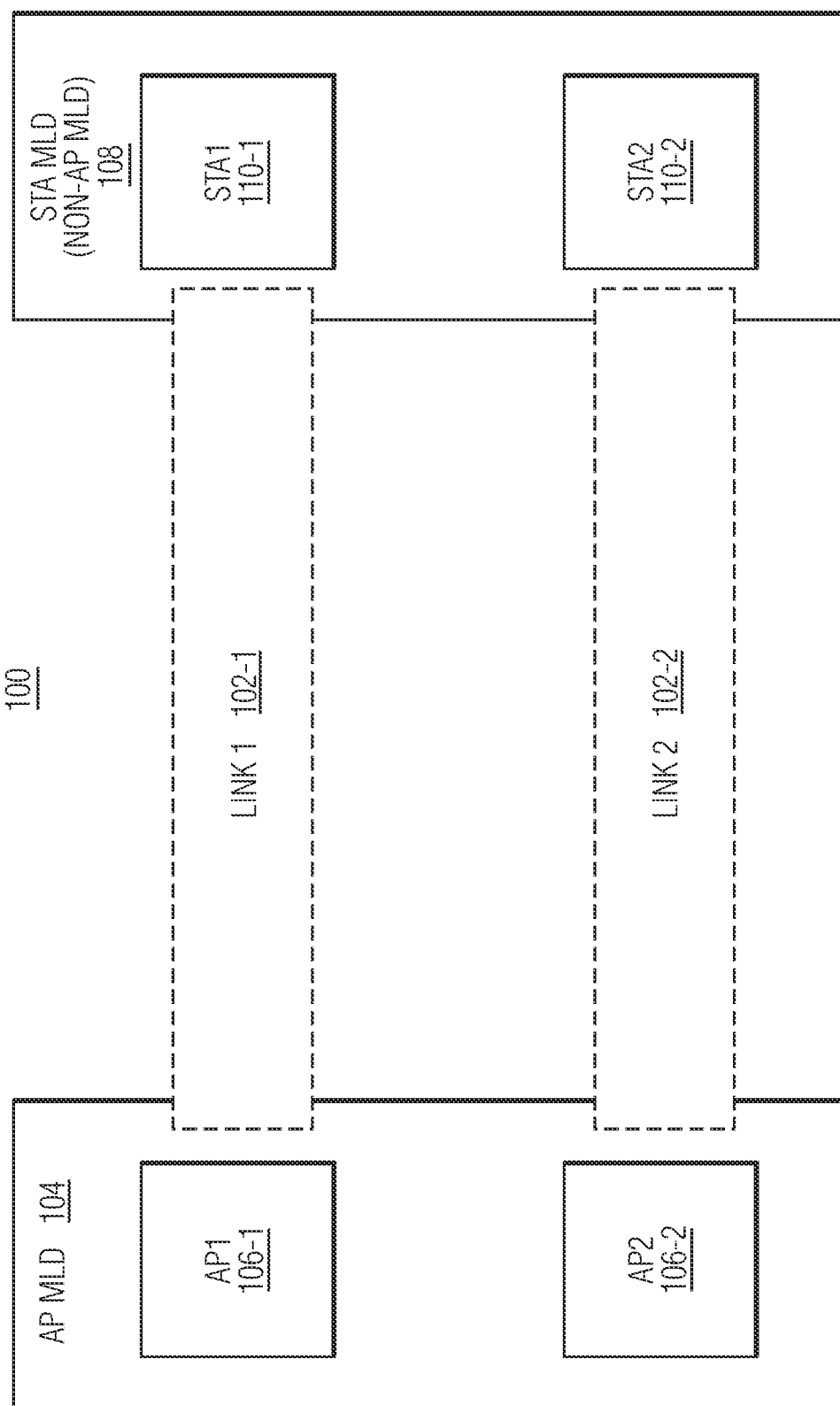
FIG. 1 depicts a multi-link communications system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, a wireless device, e.g., an access point (AP) multi-link device (MLD) of a wireless local area network (WLAN) transmits data to at least one associated station (STA) MLD. The AP MLD is configured to operate with associated STA MLDs according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., a High Efficiency (HE) communication protocol, a Very High Throughput (VHT) communication protocol, etc.) may be collectively referred to herein as "legacy" communication protocols.

FIG. 1 depicts a multi-link communications system 100 that is used for wireless (e.g., WiFi) communications. In the embodiment depicted in FIG. 1, the multi-link communications system includes one AP multi-link device, which is implemented as AP MLD 104, and one non-AP STA multi-link device, which is implemented as STA MLD 108. The multi-link communications system can be used in various applications, such as industrial applications, medical applications, computer applications, and/or consumer or enterprise applications. In some embodiments, the multi-link communications system is a wireless communications system, such as a wireless communications system compatible with an IEEE 802.11 protocol. For example, the multi-link communications system may be a wireless communications system compatible with the IEEE 802.11be protocol. Although the depicted multi-link communications system 100 is shown in FIG. 1 with certain components and described with certain functionality herein, other embodiments of the multi-link communications system may include fewer or more components to implement the same, less, or more functionality. For example, in some embodiments, the multi-link communications system includes a single AP MLD with multiple STA MLDs, or multiple AP MLDs with more than one STA MLD. In another example, although the multi-link communications system is shown in FIG. 1 as being connected in a certain topology, the network topology of the multi-link communications system is not limited to the topology shown in FIG. 1. Although the system described with reference to FIG. 1 involves multi-link communications, the techniques described herein are also applicable to single-link communications. Furthermore, the techniques described herein may also be applicable to each link of a multi-link communications system.

In the embodiment depicted in FIG. 1, the AP MLD 104 includes two radios, implemented as access points (APs) 106-1 and 106-2. In such an embodiment, the APs may be AP1 106-1 and AP2 106-2. In some embodiments, the AP MLD 104 implements upper layer Media Access Control (MAC) functionalities (e.g., beacon acknowledgement establishment, reordering of frames, etc.) and the APs 106-1 and 106-2 implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11be protocol. In some embodiments, an AP MLD connects to a local area network (e.g., a LAN) and/or to a backbone network (e.g., the Internet) through a wired connection and that wirelessly connects to wireless stations (STAs), for example, through one or more WLAN communications protocols, such as the IEEE 802.11 protocol. In some embodiments, an AP includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different size BSS operating channel. For example, AP1 106-1 may operate in a 320 MHz BSS operating channel and AP2 106-2 may operate in a 160 MHz BSS operating channel. In some of the embodiments, each of the APs 106-1 or 106-2 of the AP MLD 104 may separate the 320 MHz BSS operating channel or the 160 MHz BSS operating channel into multiple subchannels. For example, AP1 106-1 may separate the 320 MHz BSS operating channel into four 80 MHz subchannels and AP2 106-2 may separate the 160 MHz BSS operating channel into two 80 MHz subchannels. Although the AP MLD 104 is shown in FIG. 1 as including two APs, other embodiments of the AP MLD 104 may include more than two APs.

In the embodiment depicted in FIG. 1, the non-AP STA multi-link device, implemented as STA MLD 108, includes two radios which are implemented as non-AP STAs 110-1 and 110-2. In such an embodiment, the non-AP STAs may be STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD is a communications device that wirelessly connects to wireless APs. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be protocol). In some embodiments, the STA MLD 108 implements a common MAC data service interface and the non-AP STAs 110-1 and 110-2 implement a lower layer MAC data service interface. In some embodiments, the AP MLD 104 and/or the STA MLD 108 identifies which communication links support the multi-link operation during a multi-link operation setup phase and/or exchanges information regarding multi-link capabilities during the multi-link operation setup phase. In some embodiments, each of the non-AP STAs 110-1 and 110-2 of the STA MLD 108 may operate in a different frequency band. For example, the non-AP STA 110-1 may operate in the 2.4 GHz frequency band and the non-AP STA 110-2 may operate in the 5 GHz frequency band. In some embodiments, STA1 110-1 of STA MLD 108 may operate in different subchannels of an AP's (e.g., AP1 106-1) BSS operating channel. In some embodiments, STA2 110-2 of STA MLD 108 may operate in different subchannels of another AP's (e.g., AP2 106-2) BSS operating channel. For example, STA1 110-1 may operate in a first subchannel of a first BSS operating channel and STA2 110-2 may operate in a first subchannel of a second BSS operating channel. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the STA MLD 108 communicates with the AP MLD 104 via two communication links, e.g., link1 102-1 and link2 102-2. For example, each of the non-AP STAs 110-1 or 110-2 communicates with an AP 106-1 or 106-2 via corresponding communication links 102-1 or 102-2. In an embodiment, a communication link (e.g., link1 102-1 or link2 102-2) may include a BSS operating channel established by an AP (e.g., AP1 106-1 or AP2 106-2) that features multiple 20 MHz channels used to transmit frames (e.g., Physical Layer Protocol Data Units (PPDUs), beacons, management frames, etc.) between a first wireless device (e.g., an AP) and a second wireless device (e.g., a STA). In some embodiments, a 20 MHz channel may be a punctured 20 MHz channel or an unpunctured 20 MHz channel. In some embodiments, the 20 MHz channels may be aggregated to form a subchannel (e.g., an 80 MHz subchannel or a 160 MHz subchannel). Although the STA MLD 108 is shown in FIG. 1 as including two non-AP STAs, other embodiments of the STA MLD 108 may include one non-AP STA or more than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicates) with the STA MLD 108 via one link or more than two communication links.

In some embodiments, a STA of a non-AP STA MLD or an AP of an AP MLD operating according to the EHT communication protocol may be referred to herein as an EHT STA or an EHT AP, respectively. In some embodiments, a STA of a non-AP STA MLD or an AP of an AP MLD operating according to the HE communication protocol or the VHT communication protocol may be referred to herein as an HE STA, HE AP, VHT STA, or VHT AP, respectively. In some embodiments, APs and/or STAs may announce capability parameters, e.g., modulation and coding schemes (MCS), number of spatial streams (NSS), number of space time streams (NSTS), channel width (CW), bandwidth (sometimes referred to herein as "BW"), etc. Capability parameters that are in accordance with the EHT communication protocol may be referred to herein as EHT-MCS, EHT NSS, EHT NSTS, EHT CW, EHT BW, etc. Capability parameters (e.g., MCS, NSS, NSTS, CW, BW, etc.) that are in accordance with the HE communication protocol may be referred to herein as HE-MCS, HE NSS, HE NSTS, HE CW, HE BW, etc. Capability parameters (e.g., MCS, NSS, NSTS, CW, BW, etc.) that are in accordance with the VHT communication protocol may be referred to herein as VHT-MCS, VHT NSS, VHT NSTS, VHT CW, VHT BW etc.

According to the HE communication protocol, MCS and NSS support in different bandwidths (e.g., 20 MHz, 40 MHz, 80 MHz, 160 MHz, or 80+80 MHz) are flexibly defined in an HE NSS MCS capability and BSS Basic HE-MCS And NSS Set field.

A Supported HE-MCS And NSS Set field that may be implemented in an HE Capabilities Element is described in further detail with reference to FIG. 2.

FIG. 2 depicts an example of a Supported HE-MCS And NSS Set field 200. The Supported HE-MCS And NSS Set field depicted in FIG. 2 may be used by HE wireless devices (e.g., HE STAs) in a BSS to indicate MCS and NSS capabilities for different bandwidths. With reference to FIG. 2, the Supported HE-MCS And NSS Set field 200 may be implemented in a Supported HE-MCS And NSS Set field of an HE Capabilities Element (not shown). In particular, FIG. 2 depicts the Supported HE-MCS And NSS Set field 200 as including six fields, implemented as a first field, Rx HE-MCS Map ≤80 MHz 202 (2 octets), a second field, Tx HE-MCS Map ≤80 MHz 204 (2 octets), a third field, Rx HE-MCS Map 160 MHz 206 (0 or 2 octets), a fourth field, Tx HE-MCS Map 160 MHz 208 (0 or 2 octets), a fifth field, Rx HE-MCS Map 80+80 MHz 210 (0 or 2 octets), and a sixth field, Tx HE-MCS Map 80+80 MHz 212 (0 or 2 octets). In an embodiment, Rx HE-MCS Map 160 MHz 206, Tx HE-MCS Map 160 MHz 208, Rx HE-MCS Map 80+80 MHz 210, and Tx HE-MCS Map 80+80 MHz 212 may not be included (e.g., each field is 0 octets) in the Supported HE-MCS And NSS Set field 200 when the STA has a bandwidth capability of 80 MHz or less. In another embodiment, Rx HE-MCS Map 160 MHz 206, Tx HE-MCS Map 160 MHz 208, Rx HE-MCS Map 80+80 MHz 210, and Tx HE-MCS Map 80+80 MHz 212 may be included (e.g., each field is 2 octets) in the Supported HE-MCS And NSS Set field 200 when the HE STA has a bandwidth capability greater than 80 MHz (e.g., 160 MHz or 80+80 MHz).

With reference to FIG. 2, in one embodiment, an Rx HE-MCS Map subfields, Tx HE-MCS Map subfields, and Basic HE-MCS And NSS Set field encodes for "n" spatial streams, such that n is an integer greater than or equal to 1. In such an embodiment, the Rx HE-MCS Map subfields, Tx HE-MCS Map subfields, and Basic HE-MCS And NSS Set field may be used when a wireless device is operating in accordance with the IEEE HE 802.11ax standard. In some embodiments, a similar frame format (shown by the Supported HE-MCS And NSS Set field 200) may also be applied to a Supported VHT-MCS And NSS Set field. As an example, the Supported VHT-MCS And NSS Set field may be implemented in a VHT Capabilities Element and used by VHT wireless devices (e.g., VHT STAs) in a BSS to indicate MCS and NSS capabilities for different bandwidths. In some embodiments, the Supported VHT-MCS And NSS Set field may further include an Rx VHT-MCS Map subfields and Tx VHT-MCS Map subfields that encodes for "n" spatial streams such that n is an integer greater than or equal to 1. In some embodiments, a Basic VHT-MCS And NSS Set field as a BSS operation parameter encodes for "n" spatial streams, such that n is an integer greater than or equal to 1. In such an embodiment, the Rx VHT-MCS Map subfields and Tx VHT-MCS Map subfields and Basic VHT-MCS And NSS Set field may be used when a wireless device is operating in accordance with the IEEE VHT 802.11ac standard.

An Rx HE-MCS Map subfields, Tx HE-MCS Map subfields, and a Basic HE-MCS And NSS Set field as well as an Rx VHT-MCS Map subfields, Tx VHT-MCS Map subfields, and a Basic VHT-MCS And NSS Set field are described in further detail with reference to FIGS. 3A-3B.

FIG. 3A depicts an example of an Rx HE-MCS Map subfields, Tx HE-MCS Map subfields, and a Basic HE-MCS And NSS Set field 300-1. The Rx HE-MCS Map subfields and Tx HE-MCS Map subfields depicted in FIG. 3A may be used by an HE wireless device (e.g., an HE STA) in a BSS to indicate the NSS that the HE STA supports for Rx and Tx at a given MCS (e.g., MCS of no more than 7, MCS of 8, MCS of 9, MCS of 10, MCS of 11, MCS of 12, MCS of 13, etc.). In some embodiments, the Basic HE-MCS And NSS Set field may be used by an HE AP to announce the MCS and NSS that each associated STA needs to support. With reference to FIG. 3A, the Rx HE-MCS Map subfields, Tx HE-MCS Map subfields, and a Basic HE-MCS And NSS Set field 300-1 may be implemented in the fields of the Supported HE-MCS And NSS Set field 200. In particular, FIG. 3A depicts the Rx HE-MCS Map subfields, Tx HE-MCS Map subfields, and a Basic HE-MCS And NSS Set field 300-1 as including eight 2-bit subfields implemented as a first subfield, Max HE-MCS for 1 spatial stream (SS) 302-1 (B0 to B1), a second subfield, Max HE-MCS for 2 SS 304-1 (B2 to B3), a third subfield, Max HE-MCS for 3 SS 306-1 (B4 to B5), a fourth subfield, Max HE-MCS for 4 SS 308-1 (B6 to B7), a fifth subfield, Max HE-MCS for 5 SS 310-1 (B8 to B9), a sixth subfield, Max HE-MCS for 6 SS 312-1 (B10 to B11), a seventh subfield, Max HE-MCS for 7 SS 314-1 (B12 to B13), and an eighth subfield, Max HE-MCS for 8 SS 316-1 (B14 to B15).

FIG. 3B depicts an example of an Rx VHT-MCS Map subfields, Tx VHT-MCS Map subfields, and a Basic VHT-MCS And NSS Set field 300-2. The Rx VHT-MCS Map subfields and Tx VHT-MCS Map subfields depicted in FIG. 3B may be used by a VHT wireless device (e.g., a VHT STA) in a BSS to indicate the NSS that the VHT STA supports for Rx and Tx at a given MCS (e.g., MCS of no more than 7, MCS of 8, MCS of 9, MCS of 10, MCS of 11, MCS of 12, MCS of 13, etc.) as per HE-MCS and NSS support and a Basic HE-MCS And NSS Set field. In some embodiments, the Basic VHT-MCS And NSS Set field may be used by an HE AP to announce the MCS and NSS that each associated STA needs to support. With reference to FIG. 3B, the Rx VHT-MCS Map subfields, Tx VHT-MCS Map subfields, and a Basic VHT-MCS And NSS Set field 300-2 may be implemented in the fields of a Supported VHT-MCS and NSS Set field (not shown). In particular, FIG. 3B depicts the Rx VHT-MCS Map subfields, Tx VHT-MCS Map subfields, and a Basic VHT-MCS And NSS Set field 300-2 as including eight 2-bit subfields implemented as a first subfield, Max VHT-MCS for 1 SS 302-2 (B0 to B1), a second subfield, Max VHT-MCS for 2 SS 304-2 (B2 to B3), a third subfield, Max VHT-MCS for 3 SS 306-2 (B4 to B5), a fourth subfield, Max VHT-MCS for 4 SS 308-2 (B6 to B7), a fifth subfield, Max VHT-MCS for 5 SS 310-2 (B8 to B9), a sixth subfield, Max VHT-MCS for 6 SS 312-2 (B10 to B11), a seventh subfield, Max VHT-MCS for 7 SS 314-2 (B12 to B13), and an eighth subfield, Max VHT-MCS for 8 SS 316-2 (B14 to B15).

In addition to a VHT STA transmitting a Supported VHT-MCS Set field in a VHT Capabilities element to indicate the VHT STA's NSS support for Rx and Tx at a given MCS, the VHT STA may also use other frames to indicate other capabilities. In some embodiments, the VHT STA may transmit an Operating Mode Notification Element which sets a value in a Channel Width subfield of a transmitted Operating Mode field to indicate the channel width (sometimes referred to herein as "CW") of a BSS that the VHT STA may be operating in.

A table in accordance with the IEEE VHT 802.11ac standard that represents settings of a transmitted Operating Mode field at a VHT STA is described in further detail with reference to FIG. 4.

FIG. 4 is a table, 400, that represents settings of a transmitted Operating Mode field. In some embodiments, the table 400 represents the settings of a Channel Width subfield and a 160/80+80 MHz BW subfield at a VHT STA transmitting the Operating Mode field. With reference to FIG. 4, the table 400 is shown as defining settings in subfields of the transmitted Operating Mode field in a first column set (shown as including two columns that feature values for Channel Width and 160/80+80 BW), VHT Capabilities of STA transmitting the Operating Mode field in a second column set (shown as including two columns that feature values for Supported Channel Width Set and Extended NSS BW Support), NSS Support of STA transmitting the Operating Mode field as a function of the VHT PPDU (×Max VHT NSS) in a third column set (shown as including five columns that feature values for 20 MHz, 40 MHz, 80 MHz, 160 MHz, and 80+80 MHz), Location of 160 MHz center frequency if BSS bandwidth is 160 MHz (e.g., Center Channel Frequency Segment-1 (CCFS1) or Center Channel Frequency Segment-2 (CCFS2)) in a fourth column set (shown as including one column), and Location of secondary 80 MHz center frequency if BSS bandwidth is 80+80 MHz (e.g., CCFS1 or CCFS2) in a fifth column set (shown as including one column).

The EHT communication protocol (i.e., IEEE 802.11be standard) is a next version of the communications protocol that will succeed the IEEE HE 802.11ax standard and the IEEE VHT 802.11ac standard. Additional future versions (e.g., next-generation communication protocols) of the IEEE 802.11 communication protocol may succeed IEEE 802.11ax or IEEE 802.11be. It is desirable that future versions of the communication protocol provide backward compatibility and support interoperability with legacy versions of the IEEE 802.11 communication protocol.

According to the EHT communication protocol, EHT wireless devices may have improved capabilities, such that EHT wireless devices can have up to a 320 MHz (or 160/160 MHz) bandwidth capability, support for an NSS up to 16, and the capability to puncture 20 MHz channels in a BSS operating channel. However, wireless devices operating according to legacy communication protocols (e.g., the HE communication protocol and/or the VHT communication protocol) may have limited capabilities, such that HE/VHT wireless devices can only have up to a 160 MHz (or 80+80 MHz) bandwidth capability, support for an NSS up to 8, and an incapability to support NSS when 20 MHz channels in the BSS operating channel are punctured. In some embodiments, an EHT PPDU may be exchanged between two EHT wireless devices, such that EHT capabilities announced by a peer EHT device may need to be used. In some embodiments, an HE PPDU may be exchanged between two EHT wireless devices, such that HE capabilities announced by the peer EHT device may need to be used. Thus, EHT wireless devices may need to announce both EHT capabilities and HE capabilities. When EHT wireless devices communicate (e.g., exchange frames, transmit/receive information, etc.) with HE/VHT wireless devices, it is important for EHT wireless devices to account for capability differences between EHT wireless devices and HE/VHT wireless devices while simultaneously supporting capabilities of EHT wireless devices operating in accordance with the EHT communication protocol. Therefore, to support wireless operations between wireless devices operating in accordance with the same and/or different communication protocols, techniques in accordance with embodiments of the invention are described herein.

In accordance with an embodiment of the invention, a technique for wireless operations involves announcing, by a first wireless device to a second wireless device, capability parameters, wherein the first wireless device operates according to a first communication protocol and has a first bandwidth capability, and wherein the first wireless device operates according to a second communication protocol and has a second bandwidth capability that is narrower than the first bandwidth capability, receiving, at the second wireless device, the capability parameters announced by the first wireless device, and operating the second wireless device according to the capability parameters announced by the first wireless device. In some embodiments, the first wireless device may be an AP of an AP MLD (or a STA of a STA MLD) and the second wireless device may be a STA of a non-AP STA MLD (or an AP of an AP MLD). In some embodiments, the first communication protocol may be the EHT communication protocol and the second communication protocol may be the HE communication protocol or the VHT communication protocol. In some embodiments, the first bandwidth capability may be 320 MHz or 160+160 MHz, and the second bandwidth capability may be 160 MHz or 80+80 MHz. In some embodiments, capability parameters may include MCS, NSS, NSTS, CW, BW, etc., that are supported by the first wireless device and/or the second wireless device. In some embodiments, operating parameters of a first wireless device operating in accordance with the EHT communication protocol (e.g., EHT wireless device, EHT STA, or EHT AP) may be announced to a second EHT wireless device via an EHT Operating Element. In some embodiments, capabilities of the EHT wireless device, e.g., EHT capabilities and HE capabilities, may be announced to a second EHT wireless device via an EHT Capabilities Element. In some embodiments, the second wireless device may receive the capability parameters announced by the first wireless device and then operate according to the capability parameters announced by the first wireless device. Thus, the invention is a technique for enabling wireless devices to support and operate in accordance with the maximum capabilities of each wireless device. By enabling the wireless devices to support and operate in accordance with the maximum capabilities of each wireless device, the wireless devices can efficiently execute wireless operations.

An EHT Operating Element and an EHT Capabilities Element which may be used by an EHT wireless device to announce capabilities and operating parameters are described in further detail with reference to FIG. 5 and FIG. 6.

FIG. 5 depicts an example of an EHT Operating Element 500 that may be used in accordance with an embodiment of the invention. In some embodiments, the EHT Operating Element 500 may be used by a first wireless device (e.g., an EHT wireless device) to announce operating parameters to a second wireless device (e.g., an HE/VHT wireless device or another EHT wireless device). With reference to FIG. 5, the EHT Operating Element 500 is shown as including five fields, implemented as a first field, Element ID 502, a second field, Length 504, a third field, Element ID Extension 506, a fourth field, Basic EHT-MCS And NSS Set 508, and a fifth field, EHT Operating Parameters 510. In some embodiments, Basic EHT-MCS And NSS Set 508 may define the EHT-MCS and NSS that each associated EHT STA may need to support.

FIG. 6 depicts an example of an EHT Capabilities Element 600 that may be used in accordance with an embodiment of the invention. In some embodiments, the EHT Capabilities Element 600 may be used by a first wireless device (e.g., an EHT wireless device) to announce EHT capabilities to a second wireless device (e.g., an VHT wireless device or another EHT wireless device). With reference to FIG. 6, the EHT Capabilities Element 600 is shown as including six fields, implemented as a first field, Element ID 602, a second field, Length 604, a third field, Element ID Extension 606, a fourth field, MAC Capabilities 608, a fifth field, PHY Capabilities 610, and a sixth field, Supported EHT-MCS And NSS Set 612. In some embodiments, the length of Supported EHT-MCS And NSS Set 612 may be determined by bandwidth capability indicated in PHY Capabilities 610.

To account for the capabilities and operating parameters of wireless devices in communication with each other (e.g., an EHT wireless device that communicates with another EHT wireless device or an EHT wireless device that communicates with an HE/VHT wireless device), components of a basic rule are described herein.

In some embodiments, the basic rule may define a max EHT-MCS for a given number of SS (e.g., 1 SS, 2 SS, . . . , 16 SS). According to the basic rule, a max EHT-MCS for "n" SS of an EHT STA may not be smaller than a max EHT-MCS of n+1 of the EHT STA, such that n is an integer greater than or equal to 1. In another embodiment, the max EHT-MCS for "n" SS of the EHT AP may not be smaller than the max EHT-MCS of n+1 of the EHT AP, such that n is an integer greater than or equal to 1.

In some embodiments, the basic rule may define a max supported HE BW and a max supported EHT BW of an EHT STA/AP. According to the basic rule, the max supported HE BW by a wireless device (e.g., EHT STA/AP) may be no more than the max supported EHT BW by the wireless device (e.g., EHT STA/AP). In one embodiment, when the max supported EHT BW by an EHT STA/AP is no more than 160 MHz (or 80+80 MHz), then the max supported HE BW by the EHT STA/AP is the same as the max supported EHT BW. In some embodiments, "the same as" may be defined as bandwidths within a margin of ±1% of each other. In another embodiment, when the max supported EHT BW by the EHT STA/AP is more than 160 MHz (or 80+80 MHz), e.g., 320 MHz, then the max supported HE BW by the EHT STA/AP is 160 MHz (or 80+80 MHz).

In some embodiments, the basic rule may define a max supported Rx HE NSS (e.g., NSS for receiving an HE PPDU) and a max supported Rx EHT NSS (e.g., NSS for receiving an EHT PPDU) of an EHT STA/AP. According to the basic rule, at any given BW+MCS (e.g., BW of no more than 80 MHz, 160 MHz, 80+80 MHz, and MCS of no more than 7, MCS of 8, MCS of 9, MCS of 10, MCS of 11) allowed by the HE communication protocol, the max supported Rx HE NSS by a wireless device (e.g., EHT STA/AP) may be no more than the max supported Rx EHT NSS by the wireless device (e.g., EHT STA/AP). In one embodiment, when the max supported Rx EHT NSS by an EHT STA/AP at a given BW+MCS is no more than 8, then the max supported Rx HE NSS by the EHT STA/AP is the same as the max supported Rx EHT NSS at the given BW+MCS. In another embodiment, when the max supported Rx EHT NSS by the EHT STA/AP at a given BW+CW is more than 8, then the max supported Rx HE NSS by the STA/AP is 8 at the given BW+MCS.

In some embodiments, the basic rule may define a max supported HE NSTS (e.g., NSTS for transmitting an HE PPDU) and a max supported EHT NSTS (e.g., NSS for transmitting an EHT PPDU) of an EHT STA/AP. According to the basic rule, at any given BW+MCS allowed by the HE communication protocol, the max supported HE NSTS by a wireless device (e.g., EHT STA/AP) may be no more than the max supported EHT NSTS by the wireless device (e.g., EHT STA/AP). In one embodiment, when the max supported EHT NSTS by an EHT STA/AP at a given BW+MCS is no more than 8, then the max supported HE NSTS by the EHT STA/AP is the same as the max supported EHT NSTS at the given BW+MCS. In another embodiment, when the max supported EHT NSTS by the EHT STA/AP at a given BW+CW is more than 8, then the max supported HE NSTS by the EHT STA/AP is 8 at the given BW+MCS.

According to a first component of the basic rule, each EHT STA/AP may announce EHT-MCS and NSS support for bandwidth of no more than 80 MHz, 160 MHz, or 320 MHz using a Supported EHT-MCS And NSS Set. In addition, according to the first component of the basic rule, when the EHT STA/AP has a bandwidth capability of 20 MHz, the supported Rx/Tx NSS with MCS less than or equal to 7 may be different from the supported Rx/Tx NSS with MCS 8, 9, respectively. In such an embodiment, to indicate the NSS that each EHT STA/AP supports for Rx and Tx at a given MCS (e.g., MCS of no more than 7, MCS of 8, MCS of 9, MCS of 10, MCS of 11, MCS of 12, MCS of 13, etc.), the first component of the basic rule may use an Rx EHT-MCS Map subfields and Tx EHT-MCS Map subfields and Basic EHT-MCS And NSS Set field.

A Supported EHT-MCS And NSS Set and an Rx EHT-MCS Map subfields and Tx EHT-MCS Map subfields and Basic EHT-MCS And NSS Set field that are in accordance with the first component of the basic rule are described in further detail with reference to FIGS. 7A-7B.

FIG. 7A depicts an example of a Supported EHT-MCS And NSS Set 700 that may be used in accordance with an embodiment of the invention. The Supported EHT-MCS And NSS Set depicted in FIG. 7A may be used by EHT first/second wireless devices (e.g., EHT STAs/APs) in a BSS to indicate an EHT-MCS and NSS that EHT STAs/APs support for Rx and Tx at bandwidth capabilities of no more than 80 MHz, 160 MHz, or 320 MHz. With reference to FIG. 7A, the Supported EHT-MCS And NSS Set 700 may be implemented in Supported EHT-MCS And NSS Set 612 of the EHT Capabilities Element 600. In particular, FIG. 7A depicts the Supported EHT-MCS And NSS Set 700 as including six fields, implemented as a first field, Rx MCS NSS Map ≤80 MHz 702, a second field, Tx MCS NSS Map ≤80 MHz 704, a third field, Rx MCS NSS Map 160 MHz 706, a fourth field, Tx MCS NSS Map 160 MHz 708, a fifth field, Rx MCS NSS Map 320 MHz 710, and a sixth field, Tx MCS NSS Map 320 MHz 712.

With reference to FIG. 7A, in some embodiments, the Supported EHT-MCS And NSS Set 700 may feature a first set of optional fields that includes Rx MCS NSS Map 160 MHz 706 and Tx MCS NSS Map 160 MHz 708, as well as a second set of optional fields that includes Rx MCS NSS Map 320 MHz 710 and Tx MCS NSS Map 320 MHz 712. In some embodiments, the first set of optional fields and the second set of optional fields may not be included in the Supported EHT-MCS And NSS Set 700 when the EHT STA/AP has a bandwidth capability of no more than 80 MHz. In some embodiments, the second set of optional fields may not be included in the Supported EHT-MCS And NSS Set 700 when the EHT STA/AP has a bandwidth capability of 160 MHz. In some embodiments, the first set of optional fields and the second set of optional fields may both be included in the Supported EHT-MCS And NSS Set 700 when the EHT STA/AP has a bandwidth capability of 320 MHz.

FIG. 7B depicts an example of an Rx EHT-MCS Map subfields and Tx EHT-MCS Map subfields and a Basic EHT-MCS And NSS Set field 714 that may be used in accordance with an embodiment of the invention. The Rx EHT-MCS Map subfields and Tx EHT-MCS Map subfields depicted in FIG. 7B may be used by EHT first/second wireless devices (e.g., EHT STAs/AP) in a BSS to indicate the NSS that the EHT STAs/AP support for Rx and Tx at a given MCS (e.g., MCS of no more than 7, MCS of 8, MCS of 9, MCS of 10, MCS of 11, MCS of 12, MCS of 13, etc.). In some embodiments, the Basic EHT-MCS And NSS Set field depicted in FIG. 7B may be used by an EHT AP in a BSS to indicate the NSS that each associated EHT STA supports for Rx and Tx at a given MCS (e.g., MCS of no more than 7, MCS of 8, MCS of 9, MCS of 10, MCS of 11, MCS of 12, MCS of 13, etc.). With reference to FIG. 7B, the Rx EHT-MCS Map subfields and Tx EHT-MCS Map subfields may be implemented in the fields of the Supported EHT-MCS And NSS Set 700 and the Basic EHT-MCS And NSS Set field may be implemented in EHT Capabilities Element 600. In particular, FIG. 7B depicts the Rx EHT-MCS Map subfields and Tx EHT-MCS Map subfields and Basic EHT-MCS And NSS Set field 714 as including four subfields implemented as a first subfield, NSS with MCS ≤7

716, a second subfield, NSS with MCS 8, 9 718, a third subfield, NSS with MCS 10, 11 718, and a fourth subfield, NSS with MCS 12, 13 718. In some embodiments, NSS with MCS ≤7 716, NSS with MCS 8, 9 718, NSS with MCS 10, 11 720, and NSS with MCS 12, 13 722 may each be 5-bit fields for NSS 1 to 16 and feature no support. In some embodiments, NSS with MCS ≤7 716, NSS with MCS 8, 9 718, NSS with MCS 10, 11 720, and NSS with MCS 12, 13 722 may each be 4-bit fields for NSS of 1 to 16 and feature no support, in which 15 NSS and 16 NSS may be announced by a single value.

According to a second component of the basic rule, each EHT STA/AP may announce EHT-MCS and NSS support, and an EHT AP announces BSS basic EHT-MCS using one Supported EHT-MCS And NSS Set when the STA/AP has a bandwidth capability of 320 MHz, and another Supported EHT-MCS And NSS Set when the STA/AP has a bandwidth capability of 160 MHz. In such an embodiment, to indicate the NSS that each EHT STA/AP supports for Rx and Tx at a given MCS (e.g., MCS of no more than 7, MCS of 8, MCS of 9, MCS of 10, MCS of 11, MCS of 12, MCS of 13, etc.), the second component of the basic rule may use one Rx EHT-MCS Map subfields and Tx EHT-MCS Map subfields when the STA/AP has a bandwidth capability of 320 MHz, and another Rx EHT-MCS Map subfields and Tx EHT-MCS Map subfields when the STA/AP has a bandwidth capability of 160 MHz and a Basic EHT-MCS And NSS Set field.

Supported EHT-MCS And NSS Sets and Rx EHT-MCS Map subfields and Tx EHT-MCS Map subfields and Basic EHT-MCS And NSS Set fields that are in accordance with the second component of the basic rule are described in further detail with reference to FIGS. 8A-8D.

FIG. 8A depicts another example of a Supported EHT-MCS And NSS Set 800-1 that may be used in accordance with an embodiment of the invention. The Supported EHT-MCS And NSS Set depicted in FIG. 8A may be used by EHT first/second wireless devices (e.g., EHT STAs/APs) in a BSS to indicate an EHT-MCS and NSS that EHT STAs/APs with a bandwidth capability of 320 MHz support for Rx and Tx. With reference to FIG. 8A, the Supported EHT-MCS And NSS Set 800-1 may be implemented in Supported EHT-MCS And NSS Set 612 of the EHT Capabilities Element 600. In particular, FIG. 8A depicts the Supported EHT-MCS And NSS Set 800-1 as including six fields, implemented as a first field, Rx MCS NSS Map ≤80 MHz 802-1, a second field, Tx MCS NSS Map ≤80 MHz 804-1, a third field, Rx MCS NSS Map 160 MHz 806-1, a fourth field, Tx MCS NSS Map 160 MHz 808-1, a fifth field, Rx MCS NSS Map 320 MHz 810-1, and a sixth field, Tx MCS NSS Map 320 MHz 812-1.

FIG. 8B depicts another example of a Supported EHT-MCS And NSS Set 800-2 that may be used in accordance with an embodiment of the invention. The Supported EHT-MCS And NSS Set depicted in FIG. 8B may be used by EHT first/second wireless devices (e.g., EHT STAs/APs) in a BSS to indicate an EHT-MCS and NSS that EHT STAs/APs with a bandwidth capability of 160 MHz support for Rx and Tx. With reference to FIG. 8B, the Supported EHT-MCS And NSS Set 800-2 may be implemented in Supported EHT-MCS And NSS Set 612 of the EHT Capabilities Element 600. In particular, FIG. 8B depicts the Supported EHT-MCS And NSS Set 800-2 as including four fields, implemented as a first field, Rx MCS NSS Map ≤80 MHz 802-2, a second field, Tx MCS NSS Map ≤80 MHz 804-2, a third field, Rx MCS NSS Map 160 MHz 806-2, and a fourth field, Tx MCS NSS Map 160 MHz 808-2.

FIG. 8C depicts an example of an Rx EHT-MCS Map subfields and Tx EHT-MCS Map subfields 814-1 that may be used in accordance with an embodiment of the invention. The Rx EHT-MCS Map subfields and Tx EHT-MCS Map subfields depicted in FIG. 8C may be used by EHT first/second wireless devices (e.g., EHT STAs/APs) with a bandwidth capability of 320 MHz in a BSS to indicate the NSS that the EHT STAs/APs (whose bandwidth capability is 320 MHz) support for Rx and Tx at a given MCS (e.g., MCS of no more than 7, MCS of 8, MCS of 9, MCS of 10 and 11, MCS of 12 and 13, etc.). With reference to FIG. 8C, the Rx EHT-MCS Map subfields and Tx EHT-MCS Map subfields 814-1 may be implemented in the fields of the Supported EHT-MCS And NSS Set 800-1. In particular, FIG. 8C depicts the Rx EHT-MCS Map subfields and Tx EHT-MCS Map subfields 814-1 as including three subfields implemented as a first subfield, NSS with MCS ≤9 818-1, a second subfield, NSS with MCS 10, 11 820-1, and a third subfield, NSS with MCS 12, 13 822-1.

FIG. 8D depicts another example of an Rx EHT-MCS Map subfields and Tx EHT-MCS Map subfields and a Basic EHT-MCS And NSS Set field 814-2 that may be used in accordance with an embodiment of the invention. The Rx EHT-MCS Map subfields and Tx EHT-MCS Map subfields depicted in FIG. 8D may be used by EHT first/second wireless devices (e.g., EHT STAs/APs) with a bandwidth capability of 160 MHz in a BSS to indicate the NSS that the EHT STAs/APs (whose bandwidth capability is 160 MHz) support for Rx and Tx at a given MCS (e.g., MCS of no more than 7, MCS of 8, MCS of 9, MCS of 10, MCS of 11, MCS of 12, MCS of 13, etc.). In some embodiments, the Basic EHT-MCS And NSS Set field depicted in FIG. 8D may be used by an EHT AP in a BSS to indicate the NSS at various MCS that each associated EHT STA may need to support. With reference to FIG. 8D, the Rx EHT-MCS Map subfields and Tx EHT-MCS Map subfields may be implemented in the fields of the Supported EHT-MCS And NSS Set 800-2 and the Basic EHT-MCS And NSS field may be implemented in EHT Capabilities Element 600. In particular, FIG. 8D depicts the Rx EHT-MCS Map subfields and Tx EHT-MCS Map subfields and Basic EHT-MCS And NSS Set field 814-2 as including four subfields implemented as a first subfield, NSS with MCS ≤7 816-2, a second subfield, NSS with MCS 8, 9 818-2, a third subfield, NSS with MCS 10, 11 820-2, and a fourth subfield, NSS with MCS 12, 13 822-2. In some embodiments, NSS with MCS ≤7 816-2, NSS with MCS 8, 9 818-2, NSS with MCS 10, 11 820-2, and NSS with MCS 12, 13 822-2 may each be 5-bit fields for NSS of 1 to 16 and feature no support. In some embodiments, NSS with MCS ≤7 816-2, NSS with MCS 8, 9 818-2, NSS with MCS 10, 11 820-2, and NSS with MCS 12, 13 822-2 may each be 4-bit fields for NSS of 1 to 16 and feature no support, in which 15 NSS and 16 NSS may be announced by a single value.

According to a third component of the basic rule, each EHT STA/AP may announce EHT-MCS and NSS support for bandwidths of no more than 80 MHz, 160 MHz, or 320 MHz, and an EHT AP announces BSS basic EHT-MCS and NSS using EHT Capabilities Element 600 shown in FIG. 6. In addition, according to the third component of the basic rule, to indicate the NSS that each EHT STA/AP supports for Rx and Tx at a given MCS, the third component of the basic rule may use an Rx EHT-MCS Map subfields and Tx EHT-MCS Map subfields and Basic EHT-MCS And NSS Set field that features two subfields.

An Rx EHT-MCS Map subfields and Tx EHT-MCS Map subfields and Basic EHT-MCS And NSS Set field that features two subfields in accordance with the third component of the basic rule is described in further detail with reference to FIG. 9.

Figure 9:
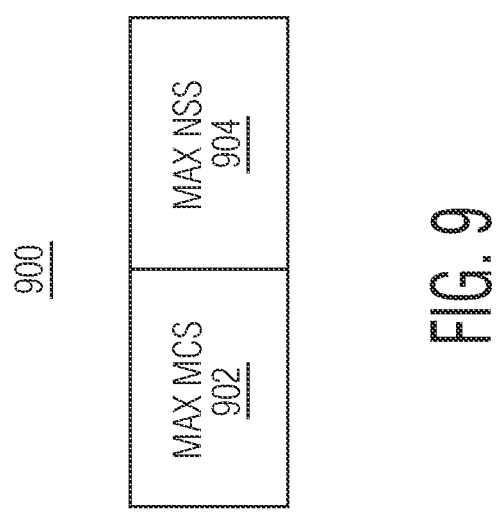
FIG. 9 depicts another example of an Rx EHT-MCS Map subfields and Tx EHT-MCS Map subfields and a Basic EHT-MCS And NSS Set field that may be used in accordance with an embodiment of the invention.

FIG. 9 depicts another example of an Rx EHT-MCS Map subfields and Tx EHT-MCS Map subfields and a Basic EHT-MCS And NSS Set field 900 that may be used in accordance with an embodiment of the invention. The Rx EHT-MCS Map subfields and Tx EHT-MCS Map subfields depicted in FIG. 9 may be used by EHT first/second wireless devices (e.g., EHT STAs/APs) in a BSS to indicate the NSS that the EHT STAs/APs (whose bandwidth capability is no more than 80 MHz, 160 MHz, or 320 MHz) support for Rx and Tx at a given MCS (e.g., MCS of no more than 7, MCS of 8, MCS of 9, MCS of 10, MCS of 11, MCS of 12, MCS of 13, etc.). In some embodiments, the Basic EHT-MCS And NSS Set field depicted in FIG. 9 may be used by an EHT AP in a BSS to indicate the NSS that each associated EHT STA supports for Rx and Tx at a given MCS (e.g., MCS of no more than 7, MCS of 8, MCS of 9, MCS of 10, MCS of 11, MCS of 12, MCS of 13, etc.). With reference to FIG. 9, the Rx EHT-MCS Map subfields and Tx EHT-MCS Map subfields may be implemented in the fields of the Supported EHT-MCS And NSS Set 700 and the Basic EHT-MCS And NSS Set field may be implemented in EHT Capabilities Element 600. In particular, FIG. 9 depicts the Rx EHT-MCS Map subfields and Tx EHT-MCS Map subfields and Basic EHT-MCS And NSS Set field 900 as including two subfields implemented as a first subfield, Max MCS 902, and a second subfield, Max NSS 904. In one embodiment, the Rx EHT-MCS Map subfields and Tx EHT-MCS Map subfields and Basic EHT-MCS And NSS Set field 900 may feature 2-bit fields for a max MCS of 0 to 7, less than or equal to 9, less than or equal to 11, or less than or equal to 13. In another embodiment, the Rx EHT-MCS Map subfields and Tx EHT-MCS Map subfields and Basic EHT-MCS And NSS Set field 900 may feature 4-bit fields for a max MCS of 1 to 16.

According to a fourth component of the basic rule, each EHT STA/AP may announce EHT-MCS and NSS support for bandwidths of no more than 80 MHz, 160 MHz, or 320 MHz, and an EHT AP announces BSS basic EHT-MCS and NSS using the Supported EHT-MCS And NSS Set 700 shown in FIG. 7A. In addition, the fourth component of the basic rule may use the Rx EHT-MCS Map subfields and Tx EHT-MCS Map subfields and Basic EHT-MCS And NSS Set field 900 shown in FIG. 9 as a Rx/Tx EHT-MCS NSS Map, and use the Rx EHT-MCS Map subfields and Tx EHT-MCS Map subfields and Basic EHT-MCS And NSS Set field 714 shown in FIG. 7A indicate the NSS that each EHT STA/AP supports for Rx and Tx at a given MCS (e.g., MCS of no more than 7, MCS of 8, MCS of 9, MCS of 10, MCS of 11, MCS of 12, MCS of 13, etc.).

In some embodiments, the operating parameters of a first wireless device operating in accordance with the EHT communication protocol (e.g., EHT wireless device) may be announced to a second wireless device operating in accordance with the HE communication protocol or the VHT communication protocol, e.g., HE/VHT wireless device, or another EHT wireless device via an EHT Operating Element (different from EHT Operating Element 500 shown in FIG. 5). In some embodiments, the capabilities of the EHT wireless device may be announced to the HE/VHT wireless device (or another EHT wireless device) via an EHT Capabilities Element (different from EHT Capabilities Element 600 shown in FIG. 6).

An EHT Operating Element and an EHT Capabilities Element which may be used by an EHT wireless device to announce capabilities and operating parameters are described in further detail with reference to FIG. 10 and FIG. 11.

FIG. 10 depicts another example of an EHT Operating Element 1000 that may be used in accordance with an embodiment of the invention. In some embodiments, the EHT Operating Element 1000 may be used by a first wireless device (e.g., an EHT wireless device) to announce operating parameters to a second wireless device (e.g., an HE/VHT wireless device or another EHT wireless device). With reference to FIG. 10, the EHT Operating Element 1000 is shown as including five fields, implemented as a first field, Element ID 1002, a second field, Length 1004, a third field, Element ID Extension 1006, a fourth field, EHT Operation Parameters 1008, and a fifth field, Basic EHT-MCS And NSS Set 1010.

FIG. 11 depicts another example of an EHT Capabilities Element 1100 that may be used in accordance with an embodiment of the invention. In some embodiments, the EHT Capabilities Element 1100 may be used by a first wireless device (e.g., an EHT wireless device) to announce capabilities to a second wireless device (e.g., an HE/VHT wireless device or another EHT wireless device). With reference to FIG. 11, the EHT Capabilities Element 1100 is shown as including six fields, implemented as a first field, Element ID 1102, a second field, Length 1104, a third field, Element ID Extension 1106, a fourth field, EHT MAC Capabilities Information 1108, a fifth field, EHT PHY Capabilities Information 1110, and a sixth field, Supported EHT-MCS And NSS Set 1112.

According to a fifth component of the basic rule, EHT-NSS MCS and basic EHT-MCS NSS Support may be defined independently from an HE announcement as specified by the HE communication protocol. In addition, the fifth component of the basic rule may use a Supported EHT-MCS And NSS Set to announce BSS basic EHT-MCS and NSS, and use an Rx EHT-MCS Map subfields and Tx EHT-MCS Map subfields and Basic EHT-MCS And NSS Set field to indicate the NSS that each EHT STA/AP supports for Rx and Tx at a given MCS.

A Supported EHT-MCS And NSS Set and an Rx EHT-MCS Map subfields and Tx EHT-MCS Map subfields and Basic EHT-MCS And NSS Set field that are in accordance with the fifth component of the basic rule are described in further detail with reference to FIGS. 12A-12B.

FIG. 12A depicts another example of a Supported EHT-MCS And NSS Set 1200 that may be used in accordance with an embodiment of the invention. The Supported EHT-MCS And NSS Set depicted in FIG. 12A may be used by EHT first/second wireless devices (e.g., EHT STAs/APs) in a BSS to indicate an EHT-MCS and NSS that EHT STAs/APs support for Rx and Tx at different bandwidth capabilities. With reference to FIG. 12A, the Supported EHT-MCS And NSS Set 1200 may be implemented in the Supported EHT-MCS And NSS Set 1112 of the EHT Capabilities Element 1100. In particular, FIG. 12A depicts the Supported EHT-MCS And NSS Set 1200 as including ten fields, implemented as a first field, Rx EHT-MCS Map ≤80 MHz 1202 (6 octets), a second field, Tx EHT-MCS Map ≤80 MHz 1204 (6 octets), a third field, Rx EHT-MCS Map 160 MHz 1206-1 (0 or 6 octets), a fourth field, Tx EHT-MCS Map 160 MHz 1208-1 (0 or 6 octets), a fifth field, Rx EHT-MCS Map 80+80 MHz 1210-1 (0 or 6 octets), a sixth field, Tx EHT-MCS Map 80+80 MHz 1212-1 (0 or 6 octets), a seventh field, Rx EHT-MCS Map 160 MHz 1206-2 (0 or 6 octets), an eighth field, Tx EHT-MCS Map 160 MHz 1208-2 (0 or 6 octets), a ninth field, Rx EHT-MCS Map 80+80 MHz 1210-2 (0 or 6 octets), and a tenth field, Tx EHT-MCS Map 80+80 MHz 1212-2 (0 or 6 octets).

In an embodiment, Rx EHT-MCS Map 160 MHz 1206-1, Tx EHT-MCS Map 160 MHz 1208-1, Rx EHT-MCS Map 80+80 MHz 1210-1, Tx EHT-MCS Map 80+80 MHz 1212-1, Rx EHT-MCS Map 160 MHz 1206-2, Tx EHT-MCS Map 160 MHz 1208-2, Rx EHT-MCS Map 80+80 MHz 1210-2, and Tx EHT-MCS Map 80+80 MHz 1212-2 may not be included (e.g., each field is 0 octets) in the Supported EHT-MCS And NSS Set 1200 when the STA has a bandwidth capability of 80 MHz or less. In another embodiment, Rx EHT-MCS Map 160 MHz 1206-1, Tx EHT-MCS Map 160 MHz 1208-1, Rx EHT-MCS Map 80+80 MHz 1210-1, Tx EHT-MCS Map 80+80 MHz 1212-1, Rx EHT-MCS Map 160 MHz 1206-2, Tx EHT-MCS Map 160 MHz 1208-2, Rx EHT-MCS Map 80+80 MHz 1210-2, and Tx EHT-MCS Map 80+80 MHz 1212-2 may be included (e.g., each field is 6 octets) in the Supported EHT-MCS And NSS Set 1200 when the STA has a bandwidth capability greater than 80 MHz (e.g., 160 MHz and/or 80+80 MHz).

FIG. 12B depicts another example of an Rx EHT-MCS Map subfields and Tx EHT-MCS Map subfields and a Basic EHT-MCS And NSS Set field 1214 that may be used in accordance with an embodiment of the invention. The Rx EHT-MCS Map subfields and Tx EHT-MCS Map subfields depicted in FIG. 12B may be used by EHT first/second wireless devices (e.g., EHT STAs/APs) in a BSS to indicate a maximal MCS for a given NSS. In some embodiments, the Basic EHT-MCS And NSS Set field depicted in FIG. 12B may be used by an EHT AP in a BSS to indicate the NSS that each associated EHT STA supports for Rx and Tx at a given MCS (e.g., MCS of no more than 7, MCS of 8, MCS of 9, MCS of 10, MCS of 11, MCS of 12, MCS of 13, etc.). With reference to FIG. 12B, the Rx EHT-MCS Map subfields and Tx EHT-MCS Map subfields may be implemented in the fields of the Supported EHT-MCS And NSS Set 1200 and the Basic EHT-MCS And NSS Set field may be implemented in EHT Capabilities Element 1100. In particular, FIG. 12B depicts the Rx EHT-MCS Map subfields and Tx EHT-MCS Map subfields and Basic EHT-MCS And NSS Set field 1214 as including sixteen 3-bit subfields implemented as a first subfield, Max EHT-MCS for 1 SS 1216 (B0 to B2), a second subfield, Max EHT-MCS for 2 SS 1218 (B3 to B5), a third subfield, Max EHT-MCS for 3 SS 1220 (B6 to B8), a fourth subfield, Max EHT-MCS for 4 SS 1222 (B9 to B11), a fifth subfield, Max EHT-MCS for 5 SS 1224 (B12 to B14), a sixth subfield, Max EHT-MCS for 6 SS 1226 (B15 to B17), a seventh subfield, Max EHT-MCS for 7 SS 1228 (B18 to B20), an eighth subfield, Max EHT-MCS for 8 SS 1230 (B21 to B23), a ninth subfield, Max EHT-MCS for 9 SS 1232 (B24 to B26), a tenth subfield, Max EHT-MCS for 10 SS 1234 (B27 to B29), an eleventh subfield, Max EHT-MCS for 11 SS 1236 (B30 to B32), a twelfth subfield, Max EHT-MCS for 12 SS 1238 (B33 to B35), a thirteenth subfield, Max EHT-MCS for 13 SS 1240 (B36 to B38), a fourteenth subfield, Max EHT-MCS for 14 SS 1242 (B39 to B41), a fifteenth subfield, Max EHT-MCS for 15 SS 1244 (B42 to B44), and a sixteenth subfield, Max EHT-MCS for 16 SS 1246 (B45 to B47).

With reference to FIG. 12B, the Max EHT-MCS for n SS subfields (where n=1, 2, . . . , 16) may be encoded to indicate the maximal MCS for n SS. For example, a value of zero indicates support for EHT-MCS 0 to 7 for n spatial streams, a value of one indicates support for EHT-MCS 0 to 9 for n spatial streams, a value of two indicates support for EHT-MCS 0 to 11 for n spatial streams, a value of three indicates support for EHT-MCS 0 to 13 for n spatial streams, values four to six are reserved, and a value of seven indicates that n spatial streams are not supported for EHT-PPDUs.

According to a sixth component of the basic rule, for a bandwidth of no more than 160 MHz (or 80+80 MHz), EHT-NSS MCS for 1 SS to 8 SS in EHT-NSS MCS capabilities and basic EHT-MCS NSS Support may be defined per HE-NSS MCS capabilities and basic HE-MCS NSS Support, respectively. Thus, the sixth component of the basic rule may use a Supported EHT-MCS And NSS Set to indicate an EHT-MCS and NSS that EHT STAs/APs support for Rx and Tx at different bandwidth capabilities, and an Rx EHT-MCS Map subfields and Tx EHT-MCS Map subfields and Basic EHT-MCS And NSS Set field to indicate the NSS that each EHT STA/AP supports for Rx and Tx at a given MCS.

A Supported EHT-MCS And NSS Set and an Rx EHT-MCS Map subfields and Tx EHT-MCS Map subfields and Basic EHT-MCS And NSS Set field that are in accordance with the sixth component of the basic rule are described in further detail with reference to FIGS. 13A-13B.

FIG. 13A depicts another example of a Supported EHT-MCS And NSS Set 1300 that may be used in accordance with an embodiment of the invention. The Supported EHT-MCS And NSS Set depicted in FIG. 13A may be used by EHT first/second wireless devices (e.g., EHT STAs/APs) in a BSS to indicate an EHT-MCS and NSS that EHT STAs/APs support for Rx and Tx at bandwidth capabilities of no more than 160 MHz (or 80+80 MHz). With reference to FIG. 13A, the Supported EHT-MCS And NSS Set 1300 may be implemented in the Supported EHT-MCS And NSS Set 1112 of the EHT Capabilities Element 1100. In particular, FIG. 13A depicts the Supported EHT-MCS And NSS Set 1300 as including ten fields, implemented as a first field, Rx EHT-MCS Map ≤80 MHz 1302 (4 octets), a second field, Tx EHT-MCS Map ≤80 MHz 1304 (4 octets), a third field, Rx EHT-MCS Map 160 MHz 1306-1 (0 or 4 octets), a fourth field, Tx EHT-MCS Map 160 MHz 1308-1 (0 or 4 octets), a fifth field, Rx EHT-MCS Map 80+80 MHz 1310-1 (0 or 4 octets), a sixth field, Tx EHT-MCS Map 80+80 MHz 1312-1 (0 or 4 octets), a seventh field, Rx EHT-MCS Map 160 MHz 1306-2 (0 or 4 octets), an eighth field, Tx EHT-MCS Map 160 MHz 1308-2 (0 or 4 octets), a ninth field, Rx EHT-MCS Map 80+80 MHz 1310-2 (0 or 4 octets), and a tenth field, Tx EHT-MCS Map 80+80 MHz 1312-2 (0 or 4 octets).

In an embodiment, Rx EHT-MCS Map 160 MHz 1306-1, Tx EHT-MCS Map 160 MHz 1308-1, Rx EHT-MCS Map 80+80 MHz 1310-1, Tx EHT-MCS Map 80+80 MHz 1312-1, Rx EHT-MCS Map 160 MHz 1306-2, Tx EHT-MCS Map 160 MHz 1308-2, Rx EHT-MCS Map 80+80 MHz 1310-2, and Tx EHT-MCS Map 80+80 MHz 1312-2 may not be included (e.g., each field is 0 octets) in the Supported EHT-MCS And NSS Set 1300 when the STA has a bandwidth capability of 80 MHz or less. In another embodiment, Rx EHT-MCS Map 160 MHz 1306-1, Tx EHT-MCS Map 160 MHz 1308-1, Rx EHT-MCS Map 80+80 MHz 1310-1, Tx EHT-MCS Map 80+80 MHz 1312-1, Rx EHT-MCS Map 160 MHz 1306-2, Tx EHT-MCS Map 160 MHz 1308-2, Rx EHT-MCS Map 80+80 MHz 1310-2, and Tx EHT-MCS Map 80+80 MHz 1312-2 may be included (e.g., each field is 4 octets) in the Supported EHT-MCS And NSS Set 1300 when the STA has a bandwidth capability of 160 MHz (or 80+80 MHz).

FIG. 13B depicts another example of an Rx EHT-MCS Map subfields and Tx EHT-MCS Map subfields and a Basic EHT-MCS And NSS Set field 1314 that may be used in accordance with an embodiment of the invention. The Rx EHT-MCS Map subfields and Tx EHT-MCS Map depicted in FIG. 13B may be used by EHT first/second wireless devices (e.g., EHT STAs/APs) in a BSS to indicate the NSS that the EHT STAs/APs supports for Rx and Tx at a given MCS (e.g., MCS of no more than 7, MCS of 8, MCS of 9, MCS of 10, MCS of 11, MCS of 12, MCS of 13, etc.). In some embodiments, the Basic EHT-MCS And NSS Set field depicted in FIG. 13B may be used by an EHT AP in a BSS to indicate the NSS that each associated EHT STA supports for Rx and Tx at a given MCS (e.g., MCS of no more than 7, MCS of 8, MCS of 9, MCS of 10, MCS of 11, MCS of 12, MCS of 13, etc.). With reference to FIG. 13B, the Rx EHT-MCS Map subfields and Tx EHT-MCS Map subfields may be implemented in the fields of the Supported EHT-MCS And NSS Set 1300 and the Basic EHT-MCS And NSS Set field may be implemented in EHT Capabilities Element 1100. In particular, FIG. 13B depicts the Rx EHT-MCS Map subfields and Tx EHT-MCS Map subfields and Basic EHT-MCS And NSS Set field 1314 as including sixteen subfields, such that the first eight subfields are each 1-bit and the subsequent eight subfields are each 3-bits. In such an embodiment, the sixteen subfields may be implemented as a first subfield, Max EHT-MCS for 1 SS 1316 (B0), a second subfield, Max EHT-MCS for 2 SS 1318 (B1), a third subfield, Max EHT-MCS for 3 SS 1320 (B2), a fourth subfield, Max EHT-MCS for 4 SS 1322 (B3), a fifth subfield, Max EHT-MCS for 5 SS 1324 (B4), a sixth subfield, Max EHT-MCS for 6 SS 1326 (B5), a seventh subfield, Max EHT-MCS for 7 SS 1328 (B6), an eighth subfield, Max EHT-MCS for 8 SS 1330 (B7), a ninth subfield, Max EHT-MCS for 9 SS 1332 (B8 to B10), a tenth subfield, Max EHT-MCS for 10 SS 1334 (B11 to B13), an eleventh subfield, Max EHT-MCS for 11 SS 1336 (B14 to B16), a twelfth subfield, Max EHT-MCS for 12 SS 1338 (B17 to B19), a thirteenth subfield, Max EHT-MCS for 13 SS 1340 (B20 to B22), a fourteenth subfield, Max EHT-MCS for 14 SS 1342 (B23 to B25), a fifteenth subfield, Max EHT-MCS for 15 SS 1344 (B26 to B28), and a sixteenth subfield, Max EHT-MCS for 16 SS 1346 (B29 to B31).

With reference to FIG. 13B, in one embodiment, the Max EHT-MCS for n SS subfields (where n=1, 2, . . . , 8) may be encoded such that a value of one indicates support for EHT-MCS 12 to 13 for n spatial streams and a value of zero indicates that HE-MCS 12 to 13 for n spatial streams is not supported for EHT PPDUs. As an example, the EHT-MCS for n spatial streams follows an HE-MCS announcement of n spatial streams in Max HE-MCS for n SS. In another embodiment, the Max EHT-MCS for n SS subfields (where n=7, 8, . . . , 16) may be encoded to indicate a maximal MCS for n SS. For example, a value of zero indicates support for EHT-MCS 0 to 7 for n spatial streams, a value of one indicates support for EHT-MCS 0 to 9 for n spatial streams, a value of two indicates support for EHT-MCS 0 to 11 for n spatial streams, a value of three indicates support for EHT-MCS 0 to 13 for n spatial streams, values four to six are reserved, and a value of seven indicates that n spatial streams are not supported for EHT-PPDUs.

In some embodiments, a first wireless device (e.g., an AP or an AP of an AP MLD) in a BSS may establish a BSS operating channel with punctured 20 MHz channels and unpunctured 20 MHz channels through a BSS operation element (e.g., static channel puncture), such that the first wireless device may have a first bandwidth (e.g., 320 MHz operating channel) permitted by a first communication protocol (e.g., the EHT communication protocol), but in which one or more 20 MHz channels within the first bandwidth are punctured; and the first bandwidth of the first wireless device that includes the punctured operating channel may be larger than a second bandwidth (e.g., 80 MHz) of a second operating channel, e.g., for HE STAs or EHT STAs that operates in the same BSS as the first wireless device to transmit HE PPDUs. As an example, the first wireless device may establish the punctured operating channel having a first bandwidth defined by the first wireless device to be 160 MHz, but in which one 20 MHz channel within the first bandwidth of 160 MHz is punctured, according to an embodiment. As another example, the first wireless device may establish the punctured operating channel having a first bandwidth defined by the first wireless device to be 320 MHz, but in which two 20 MHz channels within the first bandwidth of 320 MHz are punctured, according to an embodiment. Furthermore, the first/second wireless device may include a primary channel (e.g., a primary 20 MHz channel) within the BSS which may be used to detect transmit/receive frames (e.g., PPDUs, beacons, management frames, etc.).

BSS operating channels that may be announced by a BSS operation element which feature punctured 20 MHz channels, unpunctured 20 MHz channels, and primary 20 MHz channels are described in further detail with reference to FIGS. 14A-14B.

Figure 14A:
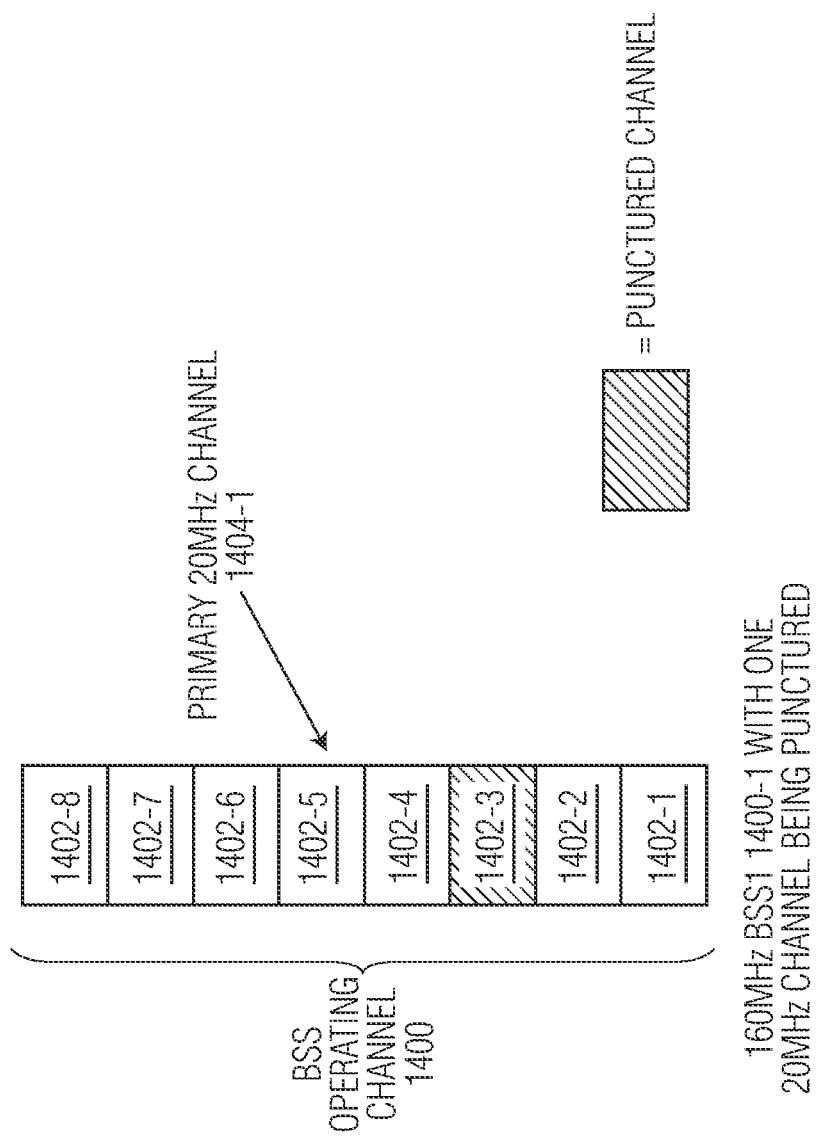
FIG. 14A depicts an example of a Basic Service Set (BSS) operating channel.

FIG. 14A depicts an example of a BSS operating channel 1400. In some embodiments, the BSS operating channel 1400 features one punctured 20 MHz channel announced by a BSS operation element (not shown). With reference to FIG. 14A, the BSS operating channel 1400 of the BSS announced by the BSS operation element is shown as including a primary 20 MHz channel, a punctured 20 MHz channel, and unpunctured 20 MHz channels which may be used by the wireless device to detect/transmit/receive PPDUs. In particular, FIG. 14A depicts the BSS operating channel 1400 of a first 160 MHz BSS, 160 MHz BSS1 1400-1, that includes eight 20 MHz channels, implemented as a first 20 MHz channel 1402-1, a second 20 MHz channel 1402-2, a third 20 MHz channel 1402-3, a fourth 20 MHz channel 1402-4, a fifth 20 MHz channel 1402-5, a sixth 20 MHz channel 1402-6, a seventh 20 MHz channel 1402-7, and an eighth 20 MHz channel 1402-8. In some embodiments, the 160 MHz BSS1 1400-1 may feature a primary 20 MHz channel to perform Clear Channel Assessment (CCA) and detect PPDUs that have a size greater than or equal to 20 MHz, for example, the fifth 20 MHz channel 1402-5 may function as the primary 20 MHz channel 1404-1 of the 160 MHz BSS1 1400-1. In some embodiments, the 160 MHz BSS1 1400-1 may feature punctured 20 MHz channels and/or unpunctured 20 MHz channels, for example, the third 20 MHz channel 1402-3 may be a punctured 20 MHz channel and each of the other channels (i.e., each 20 MHz channel of the 160 MHz BSS1 1400-1 except the third 20 MHz channel 1402-3) may be unpunctured 20 MHz channels. In some embodiments, the BSS operating channel (e.g., BSS operating channel 1400) for an associated HE STA may be 80 MHz instead of 160 MHz because the primary 80 MHz channel may not include the punctured 20 MHz channel (e.g., the third 20 MHz channel 1402-3).

Figure 14B:
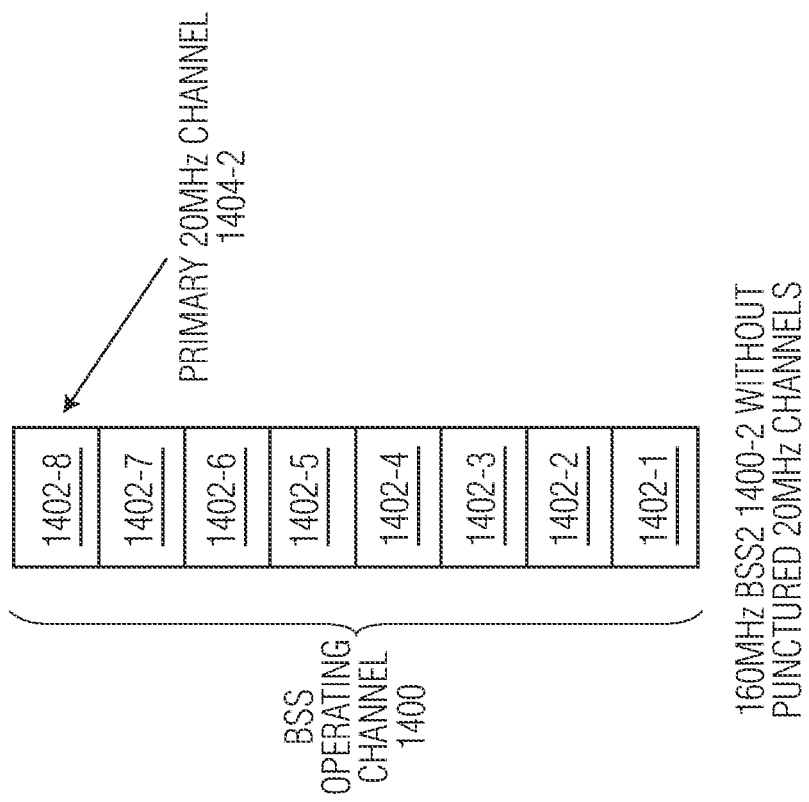
FIG. 14B depicts another example of a BSS operating channel.

FIG. 14B depicts another example of a BSS operating channel 1400. In some embodiments, the BSS operating channel 1400 may not feature punctured 20 MHz channels announced by a BSS operation element (not shown). With reference to FIG. 14B, the BSS operating channel of the BSS announced by the BSS operation element is shown as including a primary 20 MHz channel and unpunctured 20 MHz channels which may be used by the wireless device to detect/transmit/receive PPDUs. In particular, FIG. 14B depicts the BSS operating channel 1400 of a second 160

MHz BSS, 160 MHz BSS2 1400-2 announced by the BSS operation element, that includes eight 20 MHz channels, implemented as the first 20 MHz channel 1402-1, the second 20 MHz channel 1402-2, the third 20 MHz channel 1402-3, the fourth 20 MHz channel 1402-4, the fifth 20 MHz channel 1402-5, the sixth 20 MHz channel 1402-6, the seventh 20 MHz channel 1402-7, and the eighth 20 MHz channel 1402-8.

In some embodiments, when first wireless devices (e.g., EHT wireless devices) announce a BSS operating channel of a BSS (e.g., 160 MHz BSS1 1400-1) to second wireless devices (e.g., HE/VHT wireless devices or EHT wireless devices), the BSS operating channel may use an allowed EHT Channel Puncture patterns to determine a BSS operating channel puncture (static channel puncture). In one embodiment, allowed puncture patterns are the puncture patterns of an EHT single-user (SU)/multi-user (MU) PPDU being addressed to a single STA/AP (EHT non-Orthogonal Frequency-Division Multiple Access (OFDMA) puncture pattern). In such an embodiment, the punctured 20 MHz channels of an EHT BSS static Channel Puncture reflect the puncture patterns of the EHT SU/MU PPDU without OFDMA. In another embodiment, allowed static BSS operating channel punctures may include more than the puncture patterns of the EHT SU/MU PPDU being addressed to the single STA/AP. In such an embodiment, the punctured 20 MHz channels of the EHT BSS Channel Puncture may include more puncture patterns than the puncture patterns of the EHT SU/MU PPDU without OFDMA. In some embodiments, a per 20 MHz channel bitmap may be used to represent the BSS operating channel puncture.

In some embodiments, an EHT AP/STA may use a HT Operation Element, a VHT Operation Element, or an EHT Operation Element to announce a BSS operating channel when the BSS operating channel is no more than 160 MHz and does not include punctured 20 MHz channels. In such an embodiment, the EHT Operation Element of the EHT AP/STA may announce an operating channel (e.g., bandwidth) that is more than 40 MHz. For example, a value of zero indicates the bandwidth is less than 80 MHz, a value of one indicates the bandwidth is 80 MHz, a value of two indicates the bandwidth is 160 MHz, and a value of three indicates the bandwidth is 320 MHz.

In one embodiment, a BSS operating channel may be identified via EHT CCFS0 and/or EHT CCFS1. As an example, for an 80 MHz bandwidth, EHT CCFS0 announces a center frequency of the 80 MHz channel. As another example, for a 160 MHz bandwidth, EHT CCFS0 announces the center frequency of a primary 80 MHz channel and EHT CCFS1 carries the center frequency of the 160 MHz channel. As another example, for a 320 MHz bandwidth, EHT CCFS0 announces the center frequency of the primary 80 MHz channel and EHT CCFS1 announces the center frequency of the 320 MHz channel. As another example, for an 80+80 MHz bandwidth, EHT CCFS0 announces the center frequency of the primary 80 MHz channel and EHT CCFS1 carries the center frequency of a secondary 80 MHz channel. As another example, for a 160+160 MHz bandwidth, EHT CCFS0 announces the center frequency of the primary 80 MHz channel and EHT CCFS1 announces the center frequency of a secondary 160 MHz channel. In another embodiment, a BSS operating channel may be identified via EHT CCFS0 for a BSS that has no 80+80 MHz and 160+160 MHz operating channel. In such an embodiment, EHT CCFS0 may announce the center frequency of an 80 MHz channel, a 160 MHz channel, or a 320 MHz channel.

In some embodiments, punctured 20 MHz channel of a BSS operating channel that is at least 80 MHz (e.g., 80 MHz, 160 MHz, 80+80 MHz, 320 MHz, or 160+160 MHz) may be defined by an available Channel Bitmap (e.g., 20 MHz channel puncture bitmap).

Available Channel Bitmaps for BSS operating channels that are at least 80 MHz are described in further detail with reference to FIGS. 15A-15C.

Figure 15A:
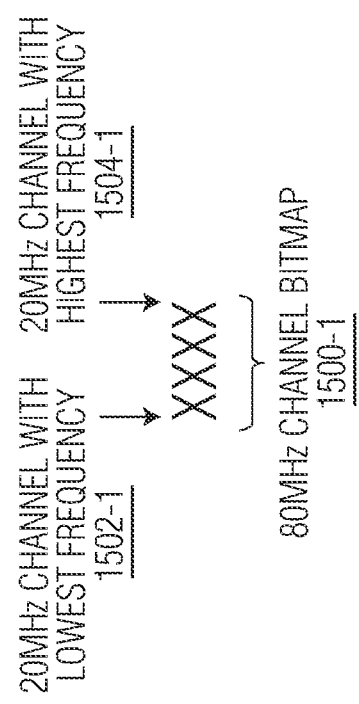
FIG. 15A illustrates an example of an available Channel Bitmap that may be used in accordance with an embodiment of the invention.

FIG. 15A illustrates an example of an available Channel Bitmap 1500-1 that may be used in accordance with an embodiment of the invention. The available Channel Bitmap 1500-1 may be used for a BSS operating channel of 80 MHz. With reference to FIG. 15A, the available Channel Bitmap 1500-1 may represent each 20 MHz channel (shown by "X"s) for the BSS operating channel of 80 MHz. In particular, FIG. 15A shows the available Channel Bitmap 1500-1 as including four 20 MHz channels (represented by the four "X"s) in which a 20 MHz channel with the lowest frequency 1502-1 and a 20 MHz channel with the highest frequency 1504-1 are indicated. In such an embodiment, X may be a bit that indicates whether a related 20 MHz channel is punctured or unpunctured. As an example, when X is a bit value of zero, it may indicate that the related 20 MHz channel is punctured. As another example, when X is a bit value of one, it may indicate that the related 20 MHz channel is unpunctured.

Figure 15B:
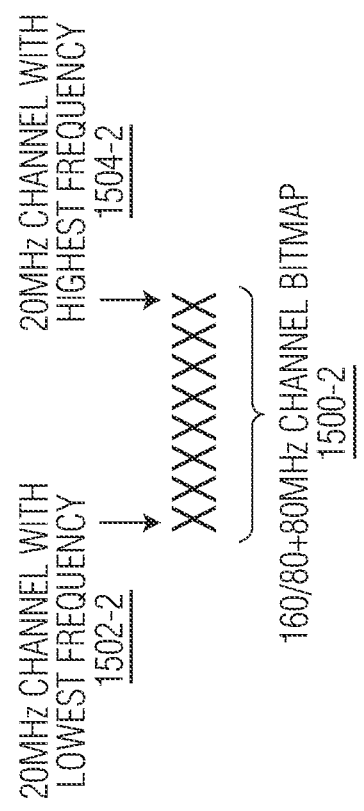
FIG. 15B illustrates another example of an available Channel Bitmap that may be used in accordance with an embodiment of the invention.

FIG. 15B illustrates another example of an available Channel Bitmap 1500-2 that may be used in accordance with an embodiment of the invention. The available Channel Bitmap 1500-2 may be used for a BSS operating channel of 160 MHz. With reference to FIG. 15B, the available Channel Bitmap 1500-2 may represent each 20 MHz channel (shown by "X"s) for the BSS operating channel of 160 MHz. In particular, FIG. 15B shows the available Channel Bitmap 1500-2 as including eight 20 MHz channels (represented by the eight "X"s) in which a 20 MHz channel with the lowest frequency 1502-2 and a 20 MHz channel with the highest frequency 1504-2 are indicated. In such an embodiment, X may be a bit that indicates whether a related 20 MHz channel is punctured or unpunctured. As an example, when X is a bit value of zero, it may indicate that the related 20 MHz channel is punctured. As another example, when X is a bit value of one, it may indicate that the related 20 MHz channel is unpunctured.

Figure 15C:
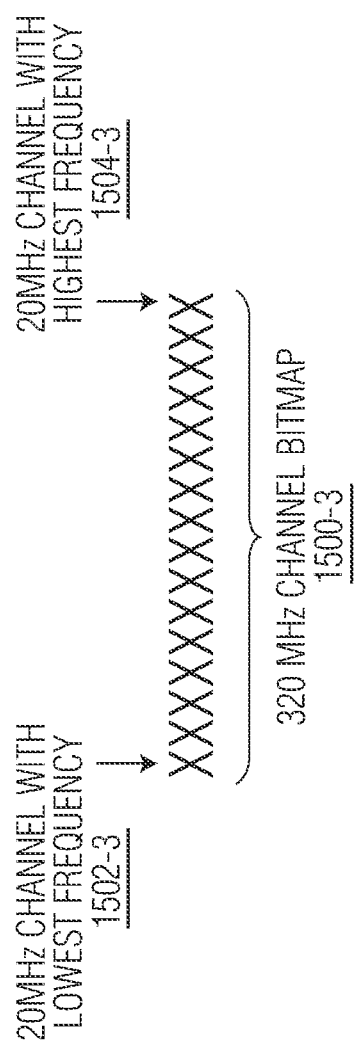
FIG. 15C illustrates another example of an available Channel Bitmap that may be used in accordance with an embodiment of the invention.

FIG. 15C illustrates another example of an available Channel Bitmap 1500-3 that may be used in accordance with an embodiment of the invention. The available Channel Bitmap 1500-3 may be used for a BSS operating channel of 320 MHz. With reference to FIG. 15C, the available Channel Bitmap 1500-3 may represent each 20 MHz channel (shown by "X"s) for the BSS operating channel of 320 MHz. In particular, FIG. 15C shows the available Channel Bitmap 1500-3 as including sixteen 20 MHz channels (represented by the sixteen "X"s) in which a 20 MHz channel with the lowest frequency 1502-3 and a 20 MHz channel with the highest frequency 1504-3 are indicated. In such an embodiment, X may be a bit that indicates whether a related 20 MHz channel is punctured or unpunctured. As an example, when X is a bit value of zero, it may indicate that the related 20 MHz channel is punctured. As another example, when X is a bit value of one, it may indicate that the related 20 MHz channel is unpunctured.

Figure 16:
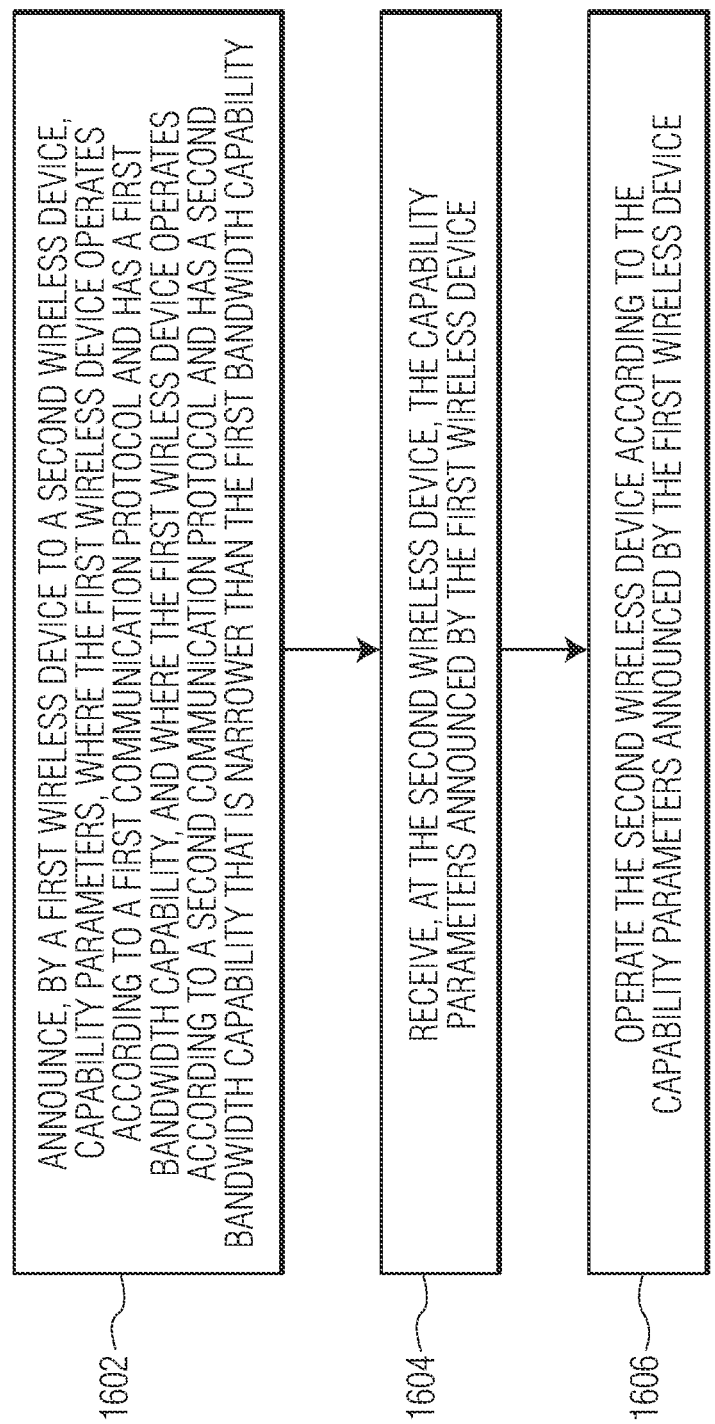
FIG. 16 illustrates a flow diagram of a technique for wireless operations in accordance with an embodiment of the invention.

FIG. 16 illustrates a flow diagram of a technique for wireless operations in accordance with an embodiment of the invention. At block 1602, a first wireless device announces to a second wireless device, capability parameters, where the first wireless device operates according to a first communication protocol and has a first bandwidth capability, and where the first wireless device operates according to a second communication protocol and has a second bandwidth capability that is narrower than the first bandwidth capability. At block 1604, the second wireless device receives the capability parameters announced by the first wireless device. At block 1606, the second wireless device operates according to the capability parameters announced by the first wireless device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A first wireless device, the first wireless device comprising:
a processor configured to:
announce,
to a second wireless device, capability parameters,
wherein the first wireless device operates according to a first communication protocol and has a first bandwidth capability, and
wherein the first wireless device operates according to a second communication protocol and has a second bandwidth capability that is narrower than the first bandwidth capability;
receiving, at the second wireless device, the capability parameters announced by the first wireless device; and
operating the second wireless device according to the capability parameters announced by the first wireless device;
wherein at a given bandwidth and modulation and coding schemes (MCS) allowed by the HE communication protocol, a max supported HE number of spatial streams (NSS) by the second wireless device is no more than a max supported Extremely High Throughput (EHT) NSS by the first wireless device.

2. The device of claim 1, wherein the first wireless device is an access point (AP) of an AP multi-link device (AP MLD) and the second wireless device is a station (STA) of a STA multi-link device (STA MLD).

3. The device of claim 1,
wherein the first communication protocol is an Extremely High Throughput (EHT) communication protocol and the second communication protocol is at least one of a High Efficiency (HE) communication protocol and a Very High Throughput (VHT) communication protocol.

4. The device of claim 1,
wherein capability parameters include at least one of modulation and coding schemes (MCS), number of spatial streams (NSS), number of space time streams (NSTS), channel width (CW), and bandwidth of at least one of the first wireless device and the second wireless device.

5. The device of claim 1,
wherein a max supported HE bandwidth by the second wireless device is no more than a max supported EHT bandwidth by the first wireless device.

6. The device of claim 5,
wherein the max supported HE bandwidth by the second wireless device is the same as the max supported EHT bandwidth by the first wireless device when the max supported EHT bandwidth is no more than 160 MHz.

7. The device of claim 5,
wherein the max supported HE bandwidth by the second wireless device is 160 MHz when the max supported EHT bandwidth is more than 160 MHz.

8. The device of claim 1,
wherein the max supported HE NSS by the second wireless device is the same as the max supported EHT NSS at the given bandwidth and MCS when the max supported EHT NSS by the first wireless device at the given bandwidth and MCS is no more than 8.

9. The device of claim 1,
wherein the max supported HE NSS by the second wireless device is 8 at the given bandwidth and MCS when the max supported EHT NSS by the first wireless device is more than 8.

10. The device of claim 1,
wherein at the given bandwidth and MCS allowed by the HE communication protocol, a max supported HE NSTS by the second wireless device is no more than a max supported EHT NSTS by the first wireless device.

11. The device of claim 10,
wherein the max supported HE NSTS by the second wireless device is the same as the max supported EHT NSS at the given bandwidth and MCS when the max supported EHT NSTS by the first wireless device is no more than 8.

12. The device of claim 10,
wherein the max supported HE NSTS by the second wireless device is 8 at the given bandwidth and MCS when the when the max supported EHT NSTS by the first wireless device is more than 8.

13. The device of claim 1,
wherein announcing capability parameters comprises announcing an EHT MCS and NSS support for a bandwidth of at least one of no more than 80 MHz, 160 MHz, and 320 MHz; and
wherein, a reception (Rx) NSS and a transmission (Tx) NSS with an MCS no more than 7 is the same as the Rx NSS and the Tx NSS with an MCS of 8 and an MCS of 9 when the second wireless device has a bandwidth capability of more than 20 MHz.

14. The device of claim 13,
wherein a Supported EHT MCS And NSS indicates the EHT MCS and NSS support; and
wherein, the Supported EHT MCS And NSS includes an Rx MCS NSS Map field and a Tx MCS NSS Map field for a bandwidth of no more than 80 MHz, an optional Rx MCS NSS Map field and a Tx MCS NSS Map field for a bandwidth of 160 MHz, and an optional Rx MCS NSS Map field and a Tx MCS NSS Map field for a bandwidth of 320 MHz.

15. The device of claim 14,
wherein an Rx EHT-MCS Map subfields and Tx EHT-MCS Map subfields and Basic EHT-MCS And NSS Set field is implemented in the Supported EHT MCS And NSS to indicate NSS support at a given MCS; and
wherein, the Rx EHT-MCS Map subfields and Tx EHT-MCS Map subfields and Basic EHT-MCS And NSS Set field includes an optional NSS with MCS no more than 7 field, an NSS with 8, 9 field, an NSS with MCS 10, 11 field, and an NSS with MCS 12, 13 field.

16. The device of claim 1, wherein an EHT-NSS MCS and basic EHT-MCS NSS Support are defined independently and a Max EHT-MCS for n spatial streams (SS) subfield is encoded to indicate a maximal MCS for n SS, and wherein n is no less than 1 and no more than 16.

17. The device of claim 1,
wherein the method comprises announcing a Basic Service Set (BSS) operating channel via at least one of:
(i) an EHT Operation Element when the BSS operating channel is more than 40 MHz, wherein the EHT Operation Element includes an EHT center channel frequency segment (CCFS) value to indicate the BSS operating channel; and
(ii) at least one of a High Throughput (HT) operation element, a VHT operation element, and an EHT operation element when the BSS operation channel is no more than 160 MHz and does not include punctured 20 MHz channels.

18. The device of claim 1,
wherein a Basic Service Set (BSS) operating channel includes at least one of punctured 20 MHz channels and unpunctured 20 MHz channels;
wherein, punctured 20 MHz channels of the BSS operating channel are determined by an allowed EHT BSS Channel Puncture; and
wherein, punctured 20 MHz channels and unpunctured 20 MHz channels of the BSS operating channel are represented by an available Channel Bitmap.

19. A first wireless device, the first wireless device comprising:
a processor configured to:
announce, to a second wireless device, capability parameters,
wherein the first wireless device operates according to a first communication protocol and has a first bandwidth capability, and
wherein the first wireless device operates according to a second communication protocol and has a second bandwidth capability that is narrower than the first bandwidth capability;
receive, at the second wireless device, the capability parameters announced by the first wireless device; and
operate the second wireless device according to the capability parameters announced by the first wireless device;
wherein at a given bandwidth and modulation and coding schemes (MCS) allowed by the HE communication protocol, a max supported HE number of space time streams (NSTS) by the second wireless device is no more than a max supported Extremely High Throughput (EHT) NSTS by the first wireless device.

20. A first wireless device, the first wireless device comprising:
a processor configured to:
announce, to a second wireless device, capability parameters,
wherein the first wireless device operates according to a first communication protocol and has a first bandwidth capability, and
wherein the first wireless device operates according to a second communication protocol and has a second bandwidth capability that is narrower than the first bandwidth capability;
receive, at the second wireless device, the capability parameters announced by the first wireless device; and
operate the second wireless device according to the capability parameters announced by the first wireless device;
wherein a Basic Service Set (BSS) operating channel includes at least one of punctured 20 MHz channels and unpunctured 20 MHz channels;
wherein, punctured 20 MHz channels of the BSS operating channel are determined by an allowed Extremely High Throughput (EHT) BSS Channel Puncture; and
wherein, punctured 20 MHz channels and unpunctured 20 MHz channels of the BSS operating channel are represented by an available Channel Bitmap.

* * * * *